(12) United States Patent
Kamata

(10) Patent No.: US 11,947,389 B2
(45) Date of Patent: Apr. 2, 2024

(54) DEVICE HOLDER AND DEVICE HOLDING SYSTEM

(71) Applicant: NINTENDO CO., LTD., Kyoto (JP)

(72) Inventor: Hideaki Kamata, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 12 days.

(21) Appl. No.: 17/373,162

(22) Filed: Jul. 12, 2021

(65) Prior Publication Data

US 2022/0019262 A1 Jan. 20, 2022

(30) Foreign Application Priority Data

Jul. 16, 2020 (JP) .................................. 2020-122331

(51) Int. Cl.
*G06F 1/16* (2006.01)
*A63F 13/98* (2014.01)
*H04M 1/72409* (2021.01)

(52) U.S. Cl.
CPC ............ *G06F 1/1632* (2013.01); *A63F 13/98* (2014.09); *H04M 1/72409* (2021.01)

(58) Field of Classification Search
CPC ...... G06F 1/1632; G06F 1/1601; G06F 3/147; A63F 13/98; A63F 13/92; H02J 7/0044; H04M 1/72409; H04M 1/04; H04N 5/655; F16M 11/105; F16M 13/02; F16M 11/041

See application file for complete search history.

(56) References Cited

U.S. PATENT DOCUMENTS

| 7,800,896 B2 * | 9/2010 | Takizawa | G06F 1/1632 361/679.41 |
| 2005/0055487 A1 | 3/2005 | Tanaka et al. | |
| 2008/0232049 A1 * | 9/2008 | Takizawa | G06F 1/1601 361/679.01 |
| 2013/0027856 A1 * | 1/2013 | Tai | F16M 13/02 361/679.01 |
| 2014/0168884 A1 * | 6/2014 | Wylie | G06F 1/1632 361/679.43 |

(Continued)

FOREIGN PATENT DOCUMENTS

| AU | 2020200012 B2 * | 6/2022 | ............ A47B 21/04 |
| JP | 2005085261 A | 3/2005 | |

(Continued)

*Primary Examiner* — Rockshana D Chowdhury
(74) *Attorney, Agent, or Firm* — Scully, Scott, Murphy & Presser

(57) ABSTRACT

A device holder 1 holds a portable electronic device having a display. The device holder has: a main body for holding the device in a state with the device placed with one side surface downward; and, a swivel block attached to the main body to be able to swivel. The main body has a main body connector connected to a device connector provided at the side surface of the device. The swivel block has, at one side surface thereof, an external connector for video output. The swivel block can swivel between a first swivel position where the side surface, with which the external connector is provided, faces a first side surface side of the main body and a second swivel position where the side surface, with which the external connector is provided, faces a second side surface side at an opposite side to the first side surface.

18 Claims, 22 Drawing Sheets

(56) References Cited

U.S. PATENT DOCUMENTS

| | | | |
|---|---|---|---|
| 2014/0355210 A1* | 12/2014 | Hashimoto | G06F 1/1679 |
| | | | 248/346.03 |
| 2015/0212785 A1* | 7/2015 | Chiba | G09G 5/12 |
| | | | 345/520 |
| 2017/0117729 A1* | 4/2017 | Hirose | G06F 1/1632 |
| 2017/0205852 A1* | 7/2017 | Owens, Jr. | H01R 27/02 |
| 2018/0024607 A1 | 1/2018 | Volek et al. | |

FOREIGN PATENT DOCUMENTS

| JP | 2008233986 A | 10/2008 |
|---|---|---|
| JP | 6463251 B2 | 1/2019 |

\* cited by examiner

FIG. 3
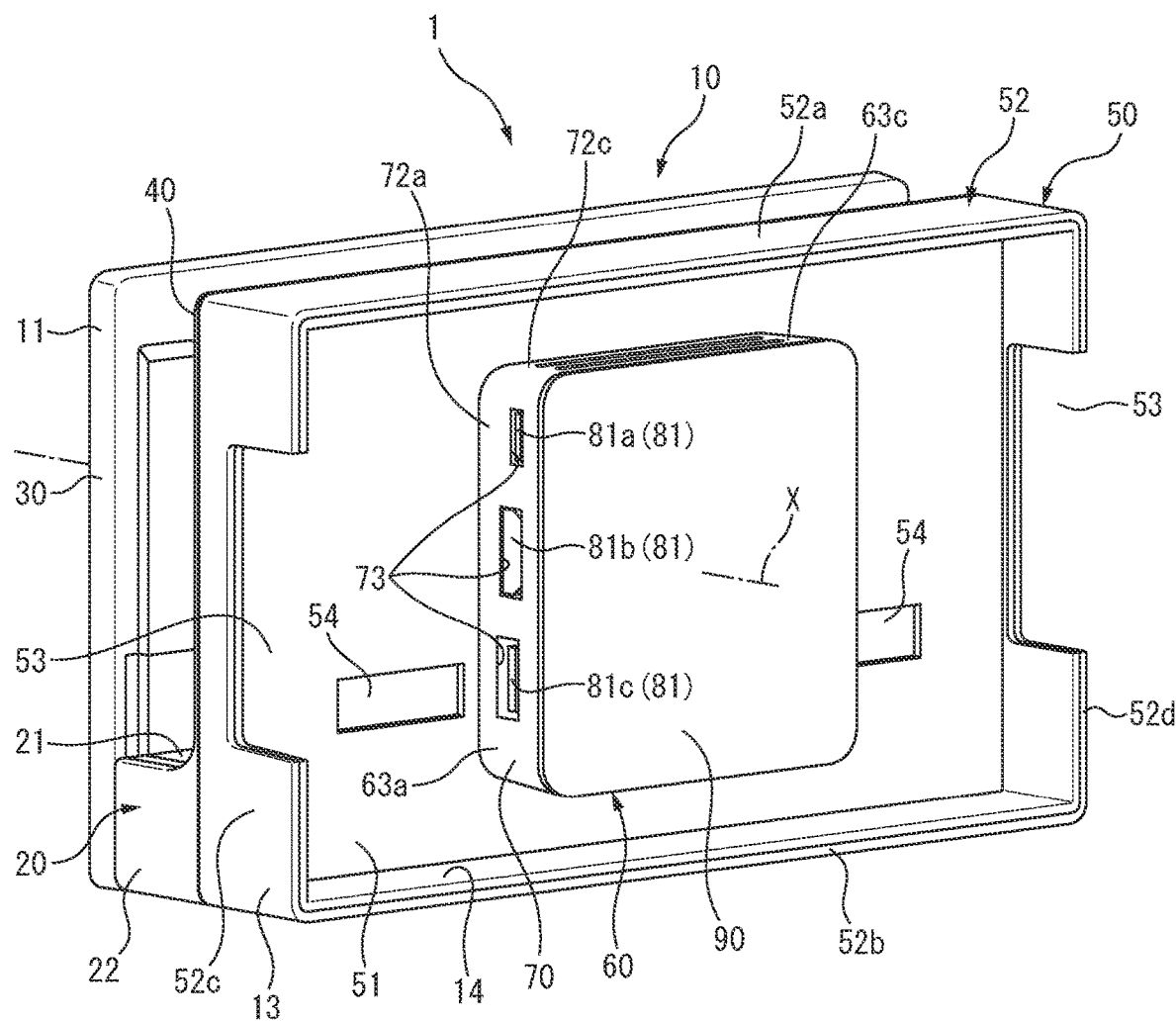
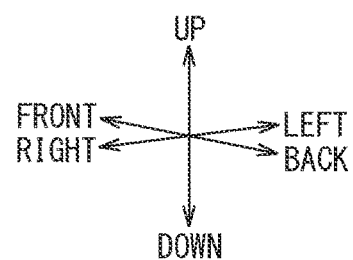

FIG. 12
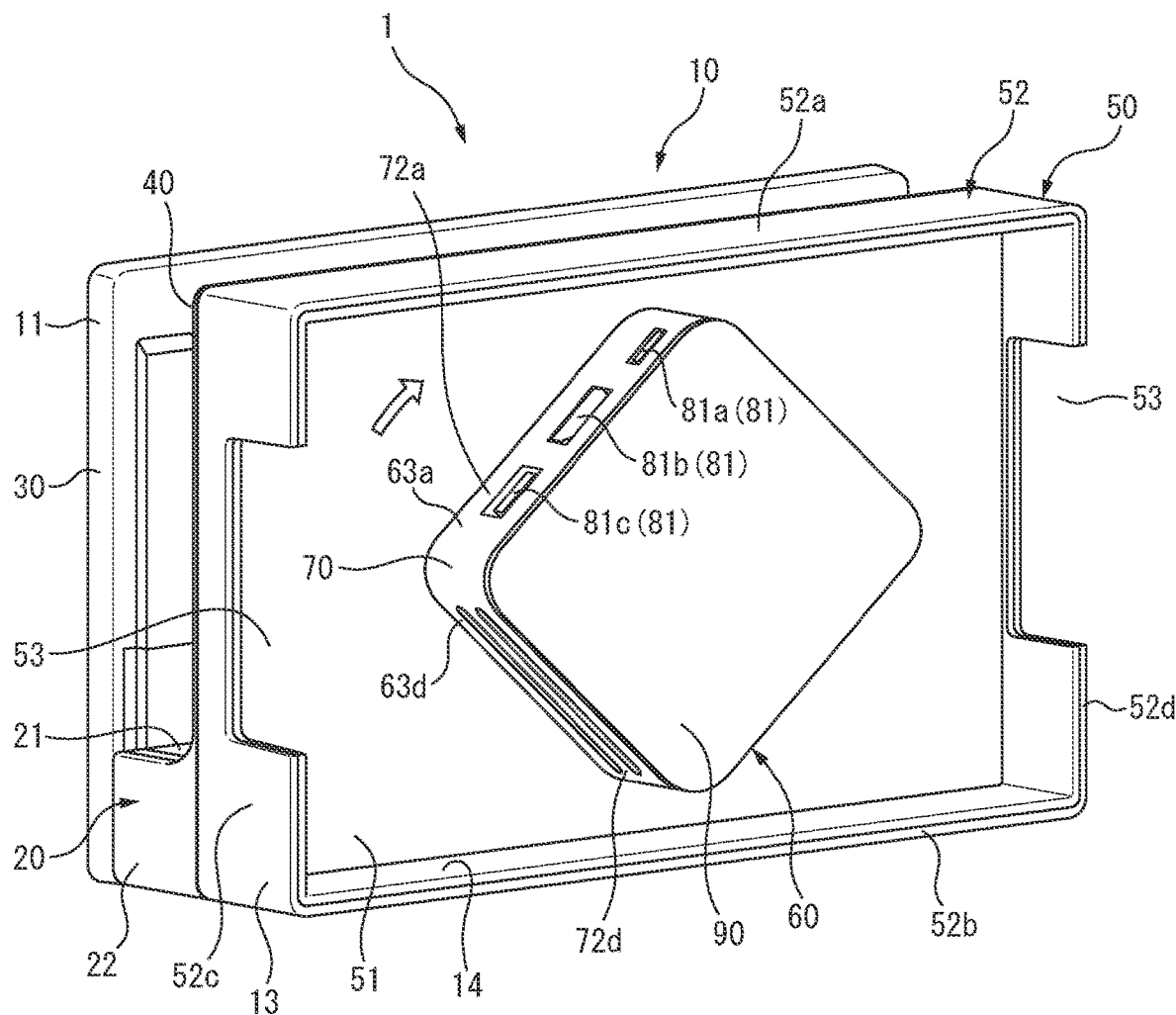
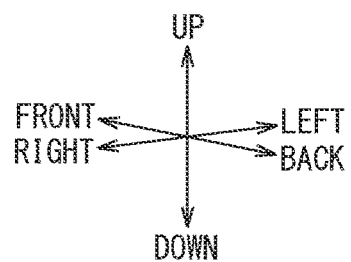

FIG. 13
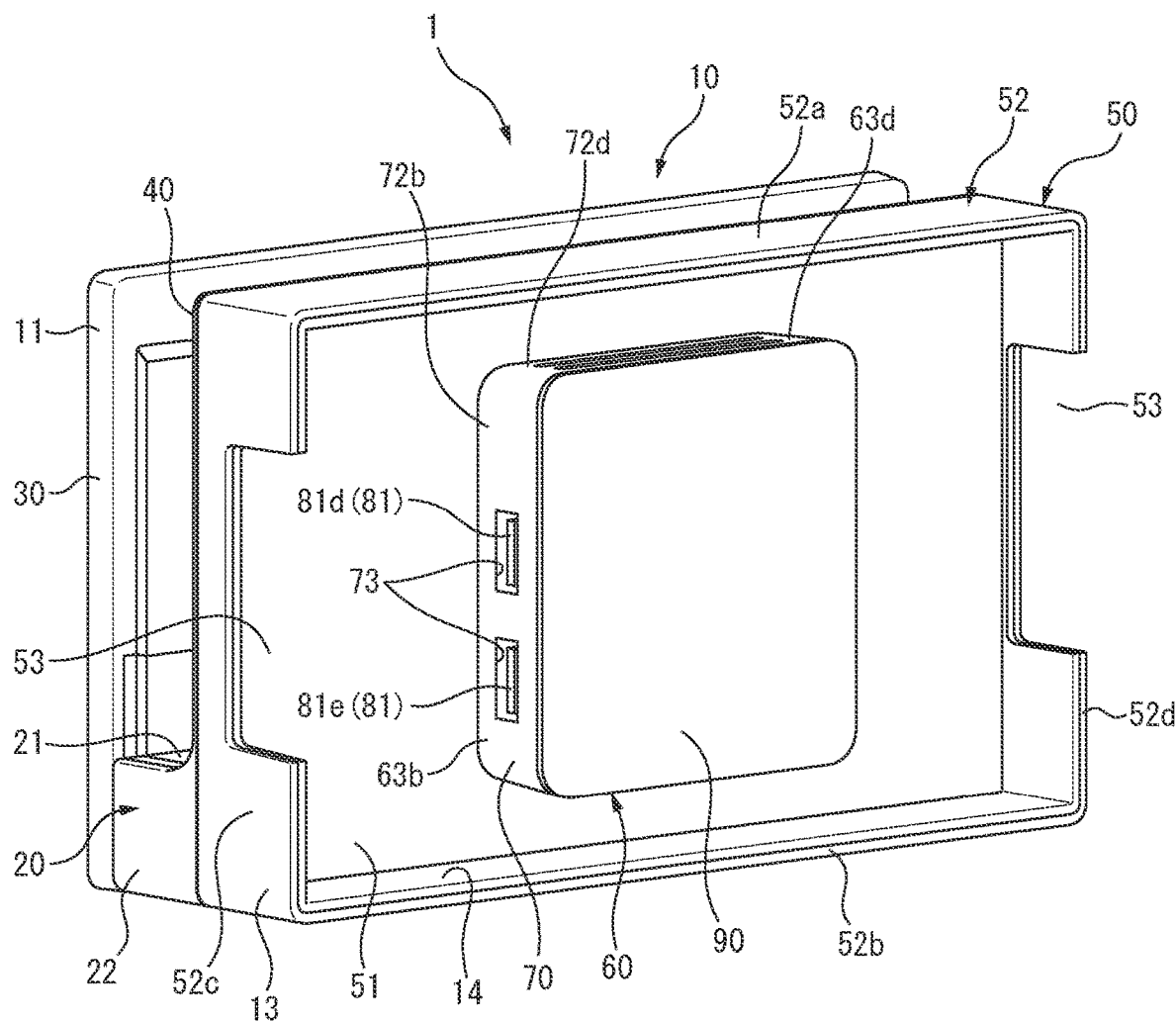
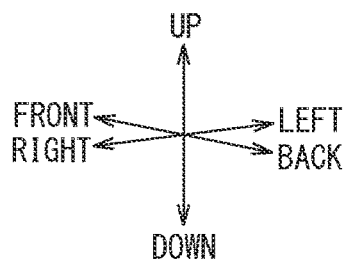

DEVICE HOLDER AND DEVICE HOLDING SYSTEM

FIELD

The present application claims priority to Japanese Patent Application No. 2020-122331 filed on Jul. 16, 2020, which is incorporated herein by reference in its entirety including the specifications, drawings and abstract.

The present disclosure relates to a device holder and a device holding system.

BACKGROUND

Known in the past has been a device holder (cradle) for holding a portable electronic device provided with a display (for example, JP 6463251 B). For example, the device holder described in JP 6463251 B is provided with a connector for connection to a portable electronic device and a connector for connection to a television receiver, and sends image data or video data received from the portable electronic device, to the television receiver.

In this regard, if a connector for connection to a television receiver or other video display device is fixed to a specific position of the outer circumference of the device holder, there is a possibility that the operation for laying the cables to be connected to this connector will be troublesome. For example, if the space for placement of the device holder is at the right side of the video display device, and if the connector is placed at the right side surface of the device holder, the cables connected to the right side surface of the device holder will be connected to the video display device disposed at the left side of the device holder, therefore the operation for laying the cables will be troublesome.

SUMMARY

The gist of the present disclosure is as follows:

(1) A device holder for holding a portable electronic device provided with a display at its front surface,
the device holder comprising: a main body configured to hold the portable electronic device in a state with the portable electronic device placed with one side surface downward; and, a swivel block attached to the main body to be able to swivel, wherein
the main body is provided with a main body connector configured to connect to a device connector provided at the side surface of the portable electronic device when the portable electronic device is held at that main body,
the swivel block is provided at one side surface thereof with an external connector for video output for outputting video data based on data input through the main body connector to an external video display device, and is able to swivel between a first swivel position where the side surface, with which the external connector for video output is provided, faces a first side surface side of the main body and a second swivel position where the side surface, with which the external connector for video output is provided, faces a second side surface side at an opposite side to the first side surface of the main body.

(2) The device holder according to (1), wherein the swivel block is provided with an external connector connectable to an operation input device used for inputting operations in the portable electronic device, on a side surface at the opposite side from the side surface, with which the external connector for video output is provided.

(3) The device holder according to (1) or (2), wherein the swivel block is provided with a USB connector on a side surface at the opposite side from the side surface, with which the external connector for video output is provided.

(4) The device holder according to (2) or (3), wherein the main body is provided with a pair of lateral side walls arranged at the two sides of the swivel block in the lateral direction, and
the lateral side walls are provided with side wall openings configured to pass cables connected to the external connector of the swivel block.

(5) The device holder according to (4), wherein the side wall openings of the pair of lateral side walls have shapes substantially symmetrical with respect to a center of the pair of lateral side walls.

(6) The device holder according to (4) or (5), wherein the swivel block is arranged so that whatever the swivel position of the first swivel position and the second swivel position that swivel block is at, the distances between the respective side wall openings and the side surfaces of the swivel block facing the side wall openings are substantially equal.

(7) The device holder according to any one of (2) to (6), wherein the swivel block is formed in a substantially cuboid shape, the side surfaces of the swivel block correspond to side surfaces of the cuboid, the external connectors are provided only at two side surfaces of the swivel block on opposite sides to each other, and the swivel block is provided with at least one air vent opening at the side surfaces not provided with the external connectors among the plurality of side surfaces.

(8) The device holder according to any one of (1) to (7), wherein the swivel block is further provided with an external connector for power supply and a USB connector at the side surface, with which the external connector for video output is provided, and the USB connector is arranged at an end of the three external connectors provided at the side surface, with which the external connector for video output is provided.

(9) The device holder according to any one of (1) to (8), wherein the swivel block can swivel between the first swivel position and the second swivel position over approximately 180°, and is formed so that when swiveling between the first swivel position and the second swivel position, the external connector for video output faces the upward direction from the main body.

(10) The device holder according to any one of (1) to (9), wherein
one of the mutually facing surfaces of the swivel block and the main body is provided with a first projection offset from a swivel axis of the swivel block,
the other of the mutually facing surfaces of the swivel block and the main body is provided with an arc shaped groove or arc shaped opening inside of which the first projection slides, the arc shaped groove or the arc shaped opening extending in a circumferential direction centered about the swivel axis over approximately 180°.

(11) The device holder according to any one of (1) to (10), wherein one of the mutually facing surfaces of the swivel block and the main body is provided with a second projection offset from a swivel axis of the swivel block, the other of the mutually facing surfaces of the swivel block and the main body is provided with a fitting groove or a fitting opening in which the second projection is fit when the swivel block is at the first swivel position or the second swivel position, and the second projection or the swivel block or the main body, with which the second projection is provided, is elastically formed so that when force in the swivel direction is applied to the swivel block in the state where the second projection is fit into the fitting groove or the fitting opening, the second projection can be pulled out from the fitting groove or the fitting opening.

(12) The device holder according to any one of (1) to (11), wherein the main body is further provided with wiring, which is connected with the main body connector and external connectors of the swivel block, the main body and the swivel block are respectively provided with a first insertion opening and second insertion opening at their mutually facing surfaces, and the wiring passes through the first insertion opening and the second insertion opening.

(13) The device holder according to any one of (1) to (11), further comprising flat wiring which is connected with the main body connector and external connectors of the swivel block, wherein the wiring is folded back so as to be twisted by approximately 90°, when the swivel block is at the first swivel position, and is folded back so as to be twisted by approximately 90° in the opposite direction to when the swivel block is at the first swivel position, when the swivel block is at the second swivel position.

(14) The device holder according to (12) or (13), wherein the wiring is arranged so as to extend inside the swivel block at a position offset from the swivel axis of the swivel block toward the swivel axis, and is arranged so as to extend inside the main body at a position offset from the swivel axis toward the swivel axis.

(15) The device holder according to any one of (12) to (14), wherein the wiring is connected to a board arranged inside the swivel block, and the board is arranged inside the swivel block at an opposite side to the main body side.

(16) The device holder according to any one of (1) to (15), wherein the main body is provided with an abutting wall abutting against the swivel block and a block support part, the swivel block is provided with a circular opening, the block support part is provided with a cylindrical part extending from the abutting wall toward the swivel block and a flange part projecting out from an end part of that cylindrical part to the outer circumferential direction, the swivel block is formed so that an edge part around the circular opening fits in a groove defined by the flange part, the cylindrical part, and the abutting wall, and the edge part slides inside of the groove whereby the swivel block swivels with respect to the main body.

(17) The device holder according to any one of (1) to (15), wherein the main body is provided with an abutting wall which abuts against the swivel block and is positioned between the swivel block and the portable electronic device when the portable electronic device is held at the main body, and the abutting wall is provided with air vent openings at the two sides of the swivel block in the lateral direction.

(18) A device holding system comprising a portable electronic device provided with a display at a front surface thereof and a device holder for holding that portable electronic device, wherein the device holder comprises a main body for holding the portable electronic device in a state with the portable electronic device placed with one side surface downward and a swivel block attached to that main body to be able to swivel, the main body is provided with a main body connector which is connected to a device connector provided at the side surface of the portable electronic device when the portable electronic device is held at that main body, the swivel block is provided at one side surface thereof with an external connector for video output for outputting video data based on data input through the main body connector to an external video display device and is able to swivel between a first swivel position where the side surface, with which the external connector for video output is provided, faces a first side surface side of the portable electronic device held at the main body and a second swivel position where the side surface, with which the external connector for video output is provided, faces a second side surface side at an opposite side to the first side surface of the portable electronic device held at the main body.

BRIEF DESCRIPTION OF DRAWINGS

Embodiments of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 3 is a perspective view of a back surface of the device holder seen from above at a slant.

FIG. 12 is a perspective view, similar to FIG. 3, of a back surface of the device holder seen from above at a slant.

FIG. 13 is a perspective view, similar to FIG. 3, of a back surface of the device holder seen from above at a slant.

DESCRIPTION OF EMBODIMENTS

Figure 1:
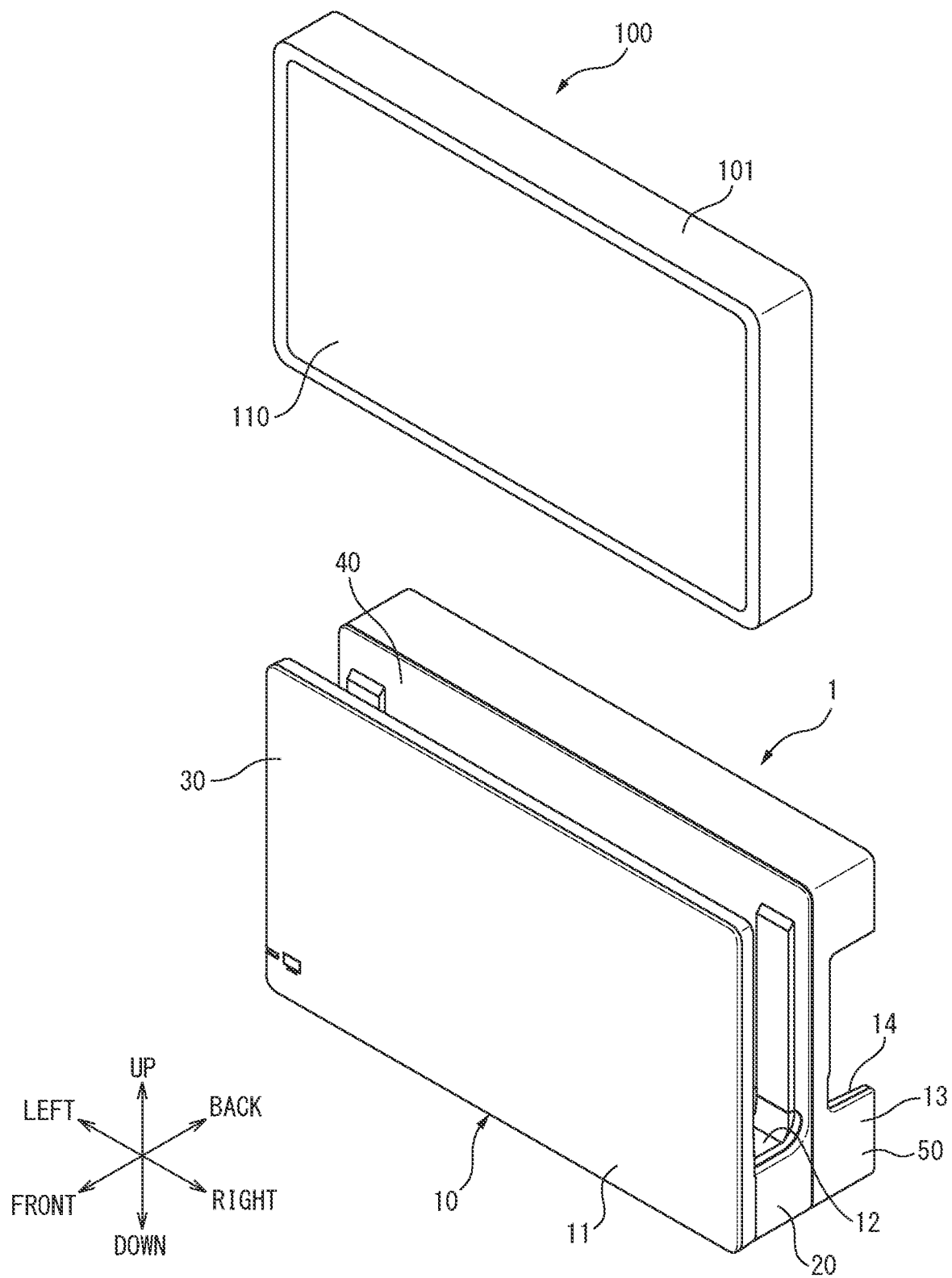
FIG. 1 is a perspective view of front surfaces of a device holder 1 and a portable electronic device seen from above at a slant.

Below, referring to the drawings, embodiments will be explained in detail. Note that, in the following explanation, similar component elements are assigned the same reference notations.

Device Holding System

Referring to the drawings, a device holding system according to one embodiment will be explained. The device holding system is provided with a portable electronic device 100 at which a display 110 is provided and a device holder 1 for holding the portable electronic device 100 at which the display 110 is provided. FIG. 1 is a perspective view of front surfaces of the device holder 1 and portable electronic device 100 seen from above at a slant.

As shown in FIG. 1, the portable electronic device 100 is formed in a substantially cuboid shape, and is provided with a display 110 at its front surface. The device holder 1 holds the portable electronic device 100 in a state vertical to a placement surface on which the device holder 1 is placed (floor surface or top surface of desk). However, the device holder 1 may hold the portable electronic device 100 so as to extend in a direction having an angle with respect to a direction vertical to the placement surface. Therefore, the device holder 1 may hold the portable electronic device 100 in any state as long as holding it in a state with one side surface of the portable electronic device 100 facing downward.

In this Description, the direction perpendicular to the placement surface and directed from the placement surface toward the device holder 1 when placing the device holder 1 on the placement surface so as to enable the portable electronic device 100 to be held will be referred to as the "upward direction" of the device holder 1, while the direction perpendicular to the placement surface and directed from the device holder 1 toward the placement surface will be referred to as the "downward direction" of the device holder 1. Further, the direction which the surface of the portable electronic device 100, on which the display 110 is provided, faces when the portable electronic device 100 is held, and the direction in the opposite orientation, will be respectively referred to as the "front direction" and "rear direction" of the device holder 1. In addition, the right and left when viewing the device holder 1 from the front will be respectively referred to as the "right side" and the "left side" of the device holder 1.

Further, in this Description, the side of the portable electronic device 100 where the display 110 is provided and the opposite side will be respectively referred to as the "front side" and "back side" of the portable electronic device 100. Furthermore, the side facing upward from the device holder 1 in the direction perpendicular to the front-back direction of the portable electronic device 100 when the portable electronic device 100 is placed on the device holder 1 and its opposite side will be respectively referred to as the "upper side" and "lower side" of the portable electronic device 100. In addition, the right and left when viewing the portable electronic device 100 from the front will be respectively referred to as the "right side" and "left side" of the portable electronic device 100.

Further, the "opening" used in this Description will include both a hole with a completely closed periphery and a notch with a partially open periphery.

Configuration of Portable Electronic Device

Figure 2A:
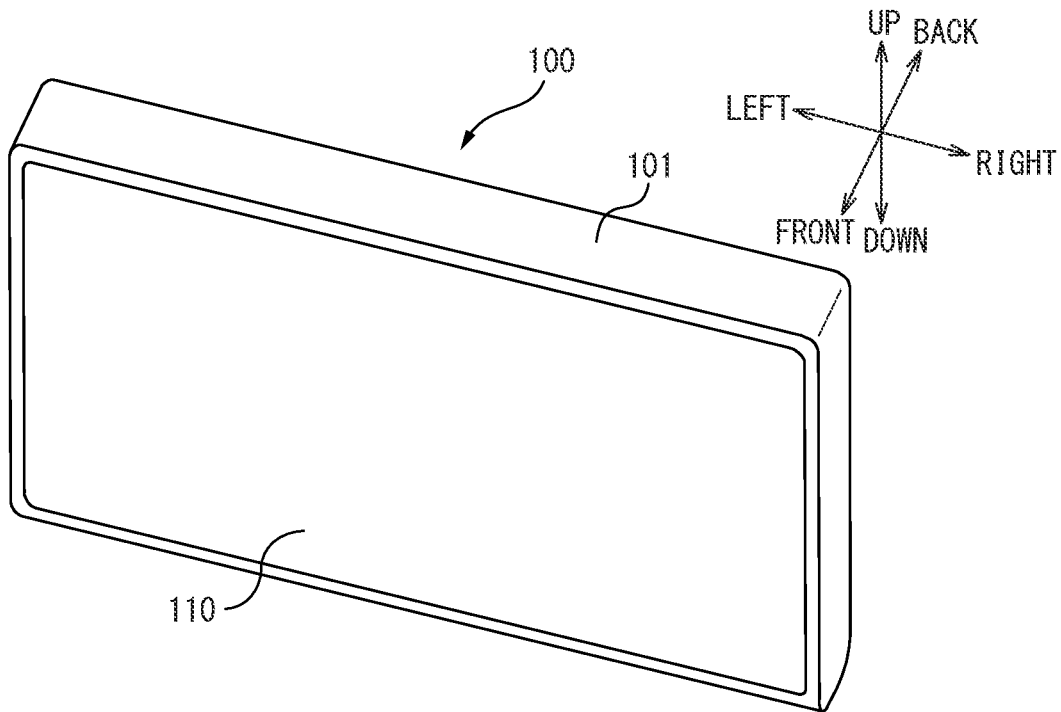
FIG. 2A is a perspective view of a front surface of the portable electronic device seen from above at a slant.
Figure 2B:
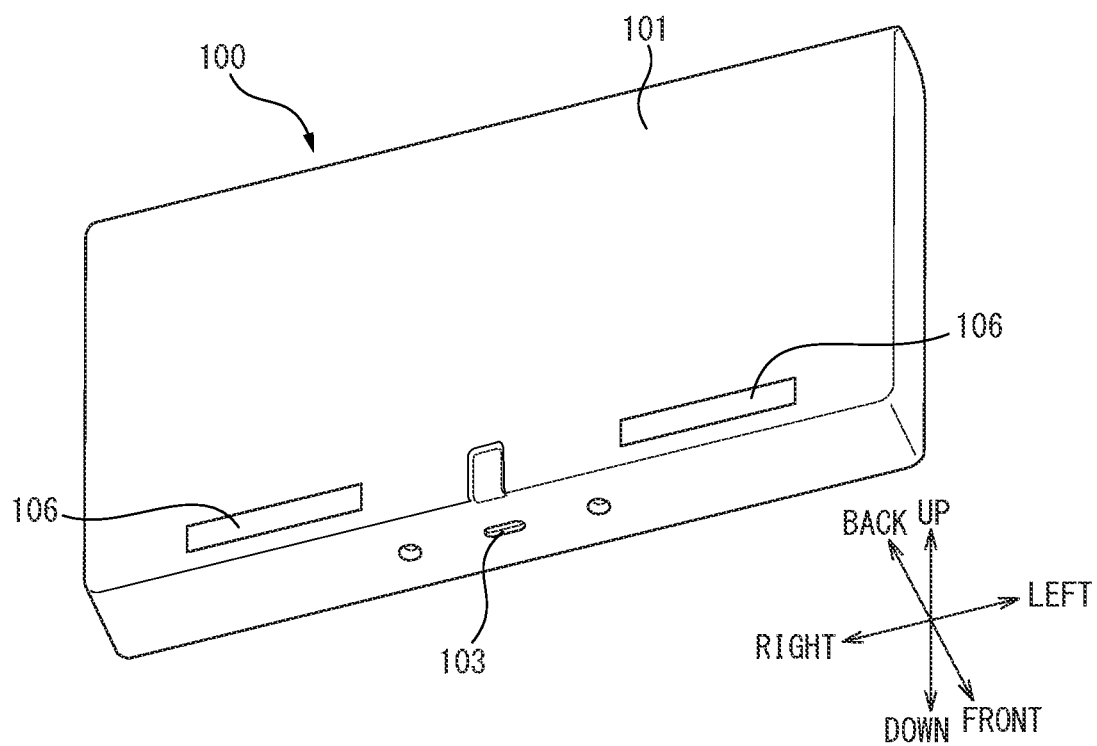
FIG. 2B is a perspective view of a back surface of the portable electronic device seen from below at a slant.

FIGS. 2A and 2B are perspective views schematically showing the portable electronic device 100. FIG. 2A is a perspective view of a front surface of the portable electronic device 100 seen from above at a slant, while FIG. 2B is a perspective view of a back surface of the portable electronic device 100 seen from below at a slant.

The portable electronic device 100 is, for example, a portable game machine, smartphone, tablet, or other portable electronic device provided with a display on its front surface. In particular, in the present embodiment, the portable electronic device 100 is a portable game machine, gaming smartphone, gaming tablet, or other electronic device on which a game can be played using the display. The portable electronic device 100 is provided with a housing 101 formed in a substantially cuboid shape and a display 110 formed on its front surface. As the display 110, a liquid crystal display, EL (electro luminescence) display, plasma display, etc., may be used.

The portable electronic device 100 may also be provided with operating buttons and other input devices at a part of the housing 101 where the display 110 is not provided. Further, the portable electronic device 100 may also be provided with, as an input device, a touch panel on the surface of the display 110.

Further, the portable electronic device 100 is configured to enable communication with a controller or other separate operation input devices. Therefore, the portable electronic device 100 can be operated by the separate operation input devices in a state held at the device holder 1. The separate operation input devices may be formed so as to be able to be attached to side surfaces of the housing 101 (in particular, right side surface and left side surface). The left side surface and right side surface of the housing 101 (these will together be referred to as the "lateral side surfaces") may be provided with mounts for attaching the operation input devices (for example, rails)

The housing 101 of the portable electronic device 100, as shown in FIG. 2B, is provided with a device connector 103 at the lower side surface. The device connector 103 is connected to the later explained main body connector 24 of the device holder 1, and is used for input/output of data between the portable electronic device 100 and the device holder 1 and charging of the portable electronic device 100. Therefore, the device connector 103 is formed so as to be able to connect to the later explained main body connector 24 of the device holder 1. The device connector 103 and main body connector 24 may be USBs or other connectors of forms complying with general standards, and may be connectors of forms complying with independent standards. The device connector 103, for example, is a female connector (port, receptacle), and is connected to a processor, memory or other electronic component provided in the portable electronic device 100.

Further, the portable electronic device 100 is provided with a pair of device air vent openings 106 downward at the back surface. The device air vent openings 106 are used for fetching outside air to the inside of the portable electronic device 100 and cooling the components inside the portable electronic device 100. The device air vent openings 106 extend in the left-right direction of the portable electronic device 100. In particular, in the present embodiment, the device air vent openings 106 are arranged symmetrically centered about the center of the portable electronic device 100 in the left-right direction. Note that, the device air vent openings 106 may, for example, be provided with mesh-like entry preventing members so as to prevent foreign matter from entering the inside of the portable electronic device 100.

Configuration of Device holder

Next, referring to FIG. 3, the configuration of the device holder 1 will be explained. FIG. 3 is a perspective view of the back surface of the device holder 1 seen from above at a slant. The device holder 1 holds the portable electronic device 100 and is used for outputting video data through a video cable to a television receiver, video monitor, projector, or other external video display device (in particular, a stationary type video display device). Further, the device holder 1 according to the present embodiment is used for charging the portable electronic device 100 held in the device holder 1 through a power cable connected to the device holder 1.

As shown in FIGS. 1 and 3, the device holder 1 is provided with the main body 10 for holding the portable electronic device 100 and a swivel block 60 attached to the main body 10 to be able to swivel. The main body 10 and swivel block 60 are formed by a plastic or another resin, glass, or metal, etc., except for the board, cables, connectors, and other electronic components.

Configuration of Main Body

Figure 4:
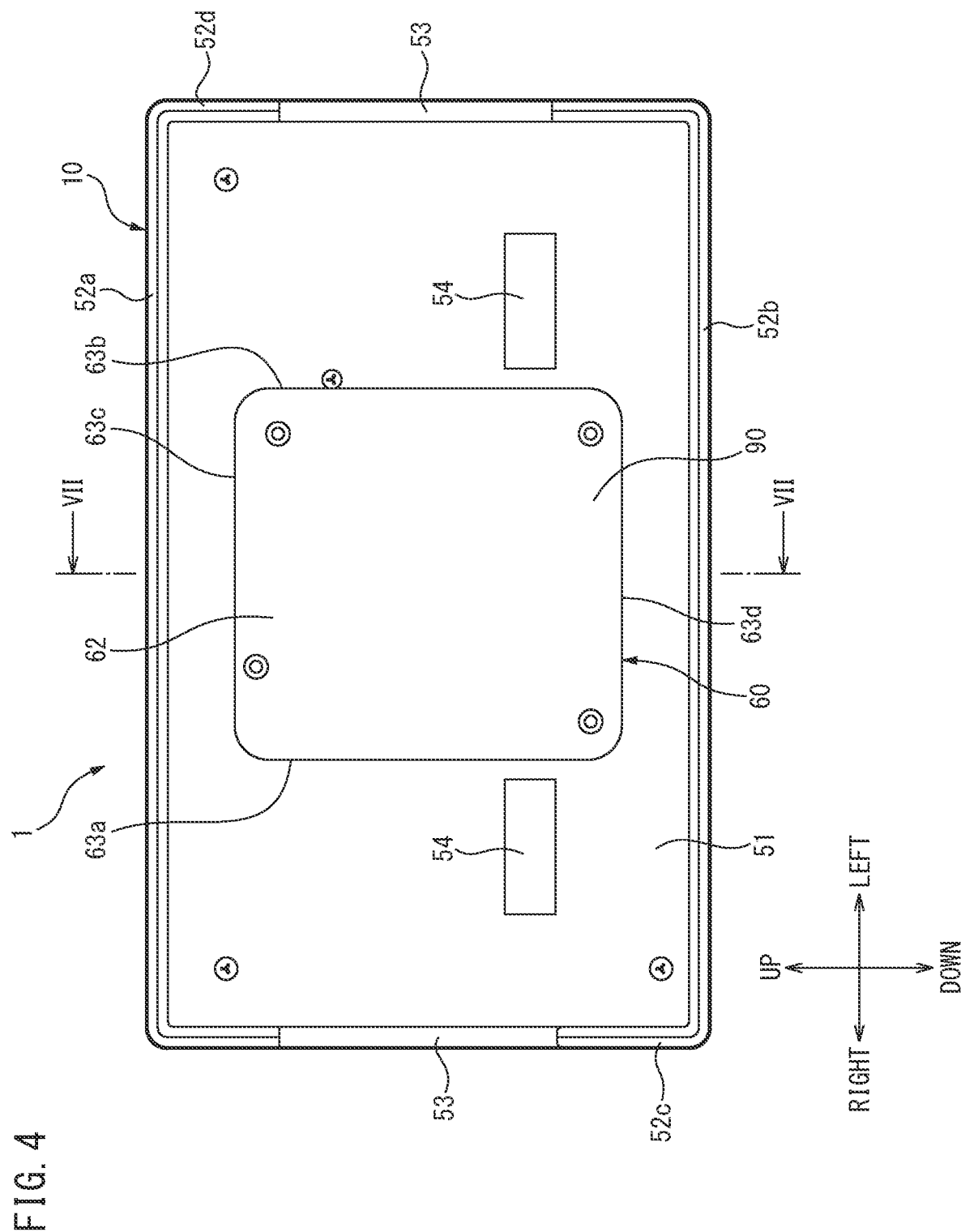
FIG. 4 is a back surface view of the device holder.
Figure 6:
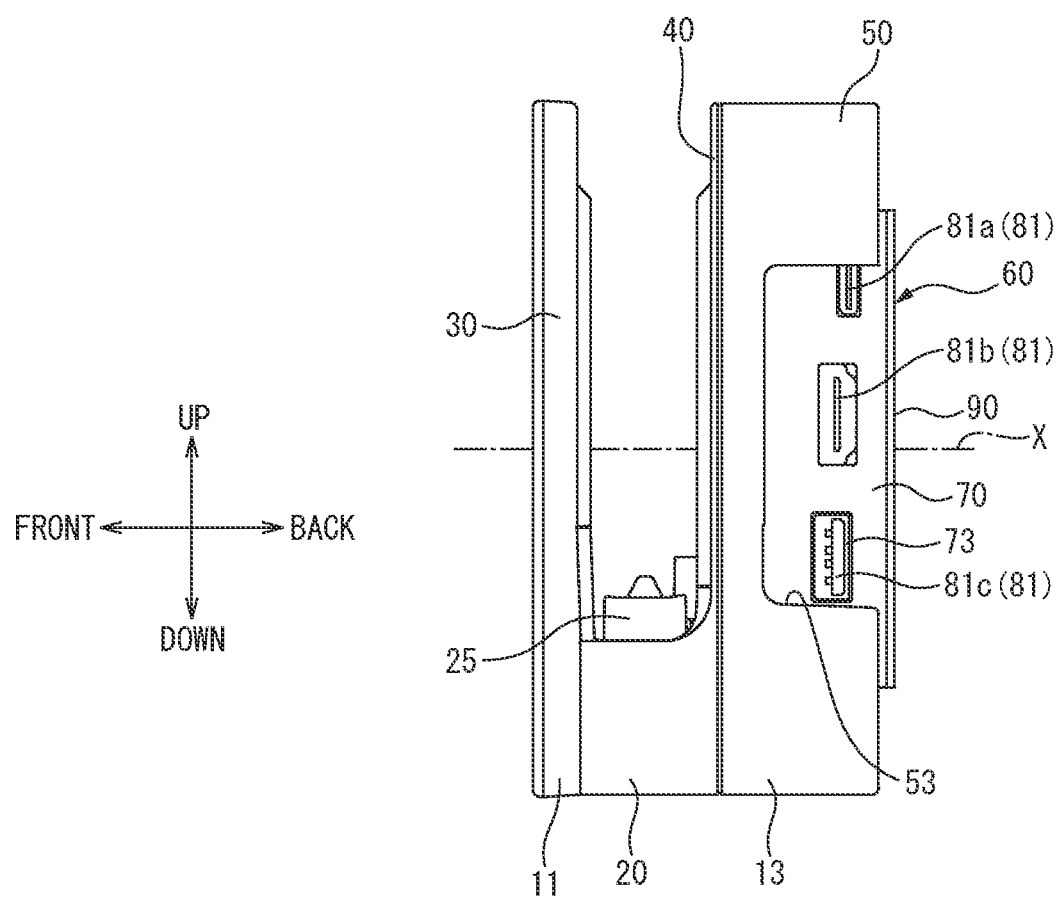
FIG. 6 is a right side surface view of the device holder.
Figure 7:
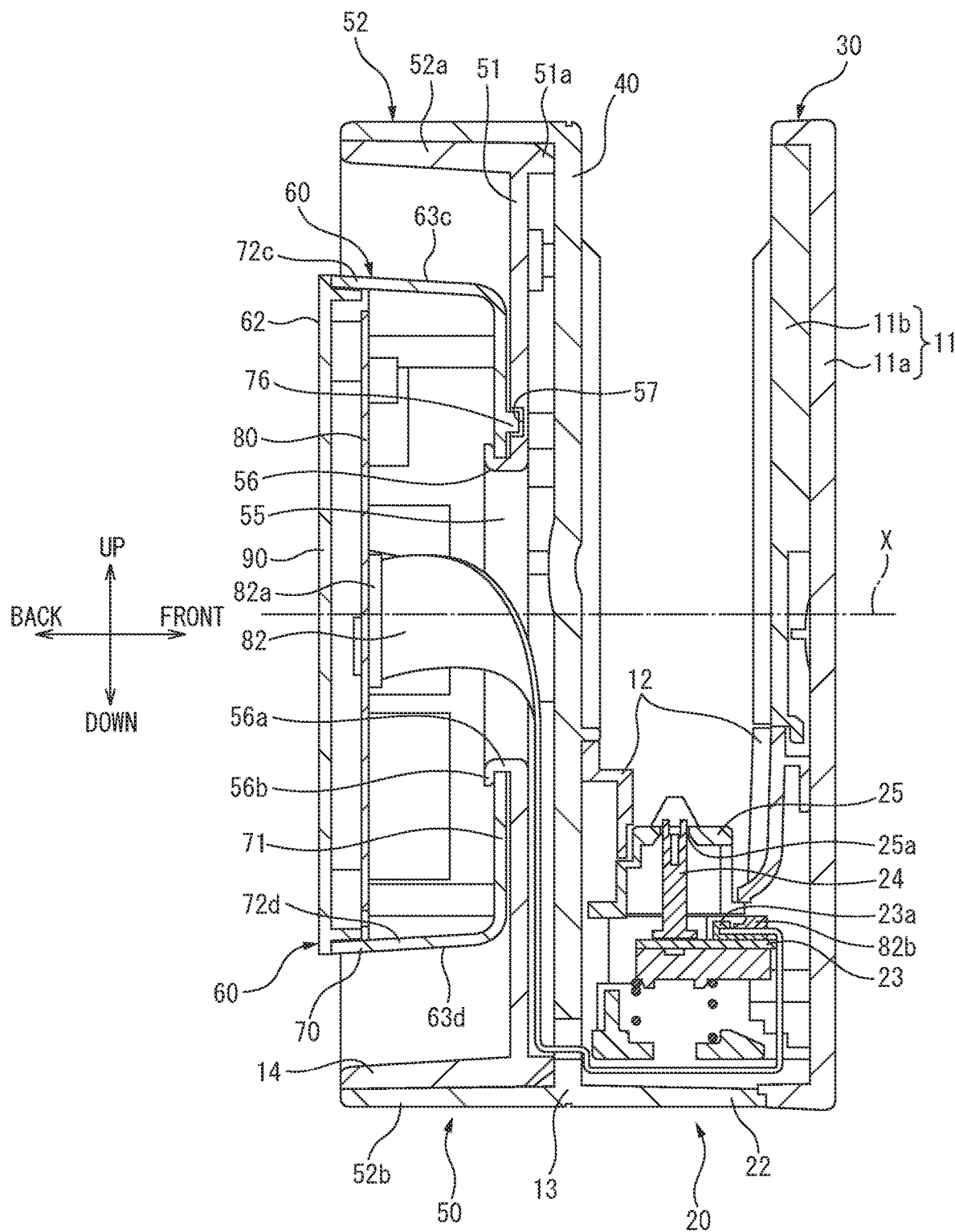
FIG. 7 is a cross-sectional side surface view of the device holder seen along the line VII-VII of FIG. 4.

First, referring to mainly FIGS. 1 and 3 to 8, the configuration of the main body 10 of the device holder 1 will be explained. FIG. 4 is a back surface view of the device holder 1, FIG. 5 is a plan view of the device holder 1, FIG. 6 is a right side surface view of the device holder 1, FIG. 7 is a cross-sectional side surface view of the device holder 1 seen along the line VII-VII of FIG. 4, and FIG. 8 is a cross-sectional front view of the device holder 1 seen along the line IIX-IIX of FIG. 5.

As shown in FIGS. 1 and 3, the main body 10 is provided with a placement part 20 on which the portable electronic device 100 is placed, a front guide part 30 arranged at the front of the placement part 20, a rear guide part 40 arranged at the rear of the placement part 20, and a block mounting part 50 arranged at the rear of the rear guide part 40 and to which the swivel block 60 is attached. Note that, the main body 10 need not necessarily be provided with all of these component elements. For example, it need not be provided with at least one of the front guide part 30 and rear guide part 40.

The placement part 20 is the part of the main body 10 at which the portable electronic device 100 is placed when the device holder 1 holds the portable electronic device 100. The placement part 20 is formed so that the width in the front-back direction is slightly larger than the width of the portable electronic device 100. Further, in the present embodiment, the left-right direction of the placement part 20 has a length substantially equal to the length of the portable electronic device 100 in the left-right direction. As shown in FIGS. 5 and 8, the placement part 20 is provided with a placement wall 21 on which the portable electronic device 100 is placed, and a lower housing 22.

Figure 5:
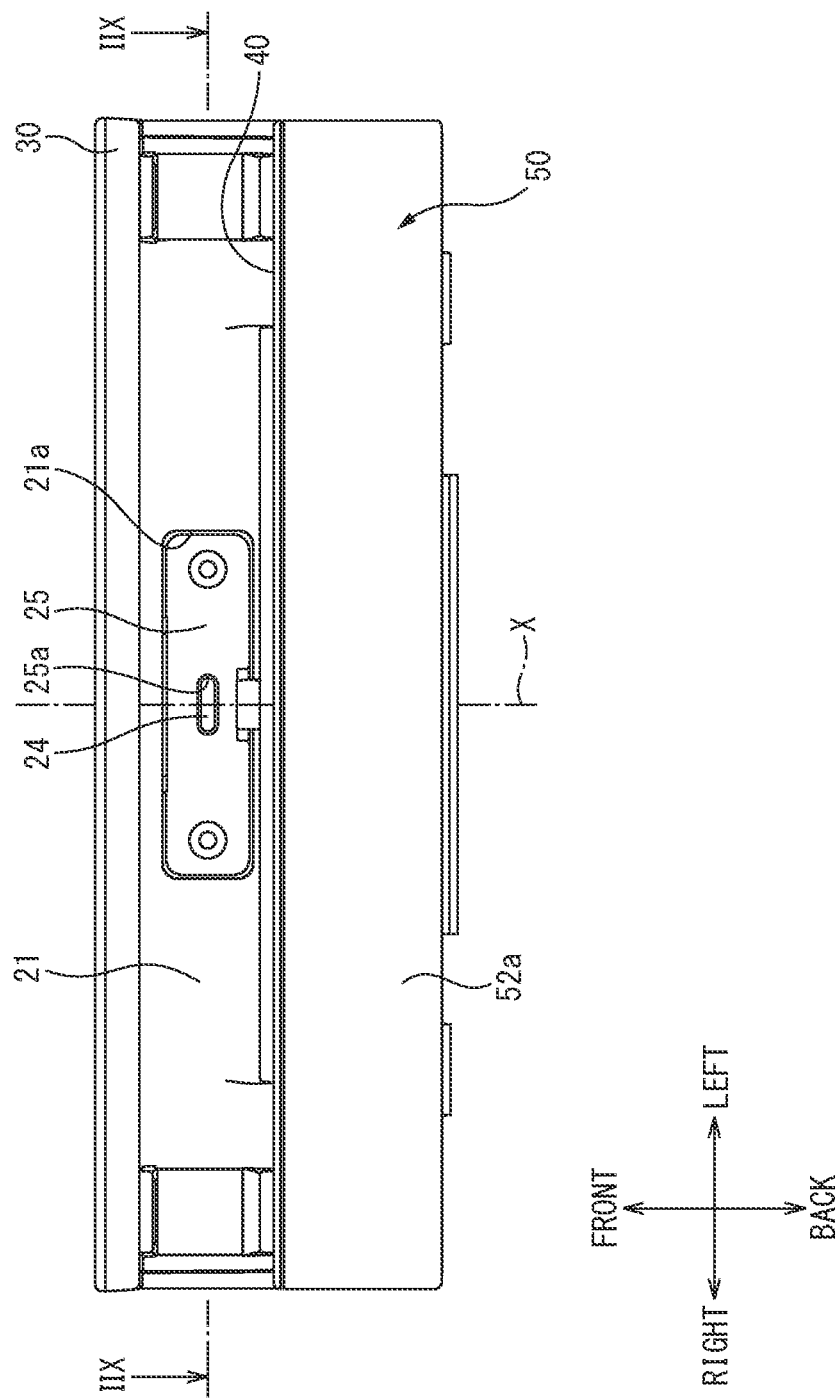
FIG. 5 is a plan view of the device holder.
Figure 8:
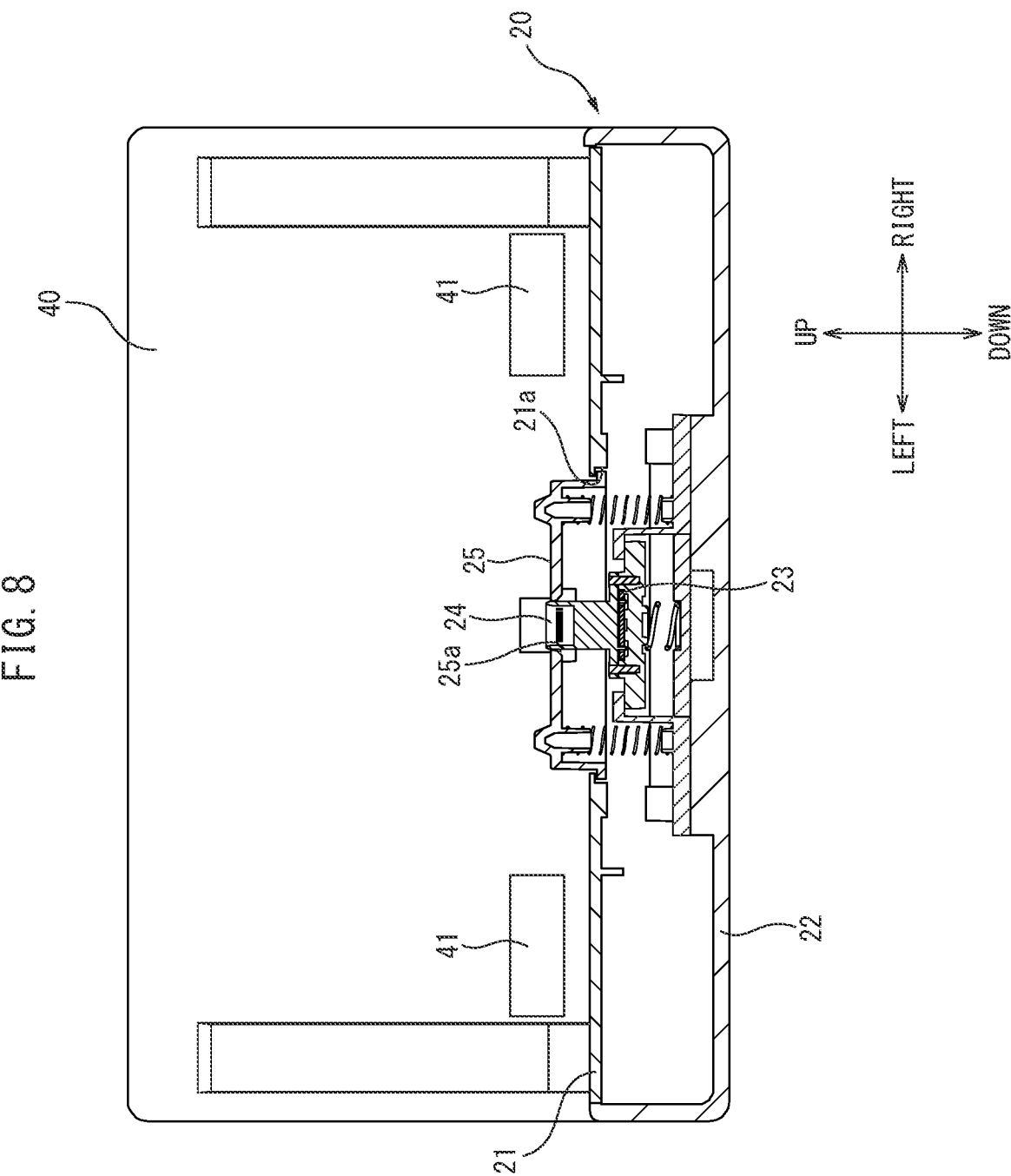
FIG. 8 is a cross-sectional front view of the device holder seen along the line IIX-IIX of FIG. 6.

As shown in FIGS. 5 and 8, the placement wall 21 extends to the left and right, and is provided with a cover opening 21a at its center. Inside the cover opening 21a, the main body connector 24 and cover 25 are arranged. The lower housing 22 defines the bottom surface and the two side surfaces of the placement part 20. The lower housing 22 is attached below the placement wall 21. Between the lower housing 22 and the placement wall 21, a space is formed. The front end of the placement wall 21 is joined with the front guide part 30, while the rear end of the placement wall 21 is joined with the rear guide part 40. Similarly, the front end of the lower housing 22 is joined with the front guide part 30, while the rear end of the lower housing 22 is joined with the rear guide part 40. The placement wall 21 may be integrally formed with one or both of the front guide part 30 and rear guide part 40, or may be formed as members separate from them. Similarly, the lower housing 22 may be formed integrally with one or both of the rear guide part 40 and front guide part 30, or may be formed as members separate from them.

Further, as shown in FIGS. 5, 7, and 8, the placement part 20 is provided with a connector board 23, a main body connector 24 mounted on the connector board 23, and a cover 25 provided around the main body connector 24. The connector board 23 performs the input/output of data and transmission of electric power between the later explained internal wiring 82 and main body connector 24. Therefore, the connector board 23 is connected to one end part of the internal wiring 82. More specifically, the connector board 23 is equipped with a first input/output connector 23a for connecting the internal wiring 82. The internal wiring 82 is connected to this first input/output connector 23a. The other end part of the internal wiring 82 is connected to the second input/output connector 83 of the later explained main board 80.

Further, the connector board 23 is equipped with the main body connector 24. The main body connector 24 is connected to the device connector 103 of the portable electronic device 100, and is used for input/output of data or for charging the portable electronic device 100. Therefore, the main body connector 24 is formed to enable connection with the device connector 103. For this reason, the main body connector 24 is a connector complying with the same standard as the device connector 103. The main body connector 24 is, for example, a male connector (plug), and is arranged to extend upward from the connector board 23 perpendicular to the connector board 23. Further, the main body connector 24 is connected with the internal wiring 82 through the connector board 23 and first input/output connector 23a.

As shown in FIGS. 7 and 8, the cover 25 is arranged so as to cover the surroundings of the main body connector 24. The cover 25 is provided with a connector opening 25a at its center. The connector opening 25a is formed so that the main body connector 24 can pass through the connector opening 25a. The cover 25 can move in the up-down direction, and is configured so as to cover the main body connector 24 when the portable electronic device 100 is not held by the device holder 1.

In the present embodiment, the main body connector 24 extends toward the direction in which the portable electronic device 100 is held (in the present embodiment, upward) and is attached to the lower housing 22 so as not to fall over in the lateral direction. For this reason, the main body connector 24 holds the portable electronic device 100 when the device connector 103 of the portable electronic device 100 is plugged in. Therefore, in the present embodiment, the portable electronic device 100 is held by the placement part 20 having the main body connector 24.

Note that, the portable electronic device 100 in the present embodiment is held by only the placement part 20, but in addition to the placement part 20, it may be held by at least one of the front guide part 30 and rear guide part 40. In this case, the portable electronic device 100 is supported so as not to fall over by at least parts of the front guide part 30 and rear guide part 40.

The front guide part 30 is a part of the main body 10, which guides the front surface of the portable electronic device 100 when the portable electronic device 100 is placed on the placement part 20. The front guide part 30 is also used for protecting the front surface of the portable electronic device 100. The front guide part 30, as shown in FIGS. 1, 3, and 6, is joined with the front of the placement part 20, projects out upward from the top surface of the placement part 20, and is formed in a flat plate shape. In the present embodiment, the front guide part 30 extends upward up to the same height as or up to the height lower than the top surface of the portable electronic device 100 when the portable electronic device 100 is held at the main body 10. As a result, when the portable electronic device 100 is held at the main body 10, it is possible to at least partially cover the display 110 of the portable electronic device 100 and possible to protect the display 110 of the portable electronic device 100. The length of the front guide part 30 in the left-right direction is the same as the length of the placement part 20 in the left-right direction.

Note that, the front guide part 30 may also extend upward up to a height different from the rear guide part 40. For example, the front guide part 30 may also be formed to have a lower height so that the display 110 as a whole is visible when the portable electronic device 100 is held by the main body 10. Further, if the main body 10 holds the portable electronic device 100 so as to extend in a direction having an angle with respect to the direction vertical to the placement surface, the front guide part 30 may extend forward or backward at a slant from the direction vertical to the placement surface, corresponding to the holding angle. Further, the length of the front guide part 30 in the left-right direction may be longer than or shorter than the length of the placement part 20 in the left-right direction.

The rear guide part 40 is part of the main body 10, which guides the back surface of the portable electronic device 100 when the portable electronic device 100 is placed on the placement part 20. The rear guide part 40 is also used for protecting the back surface of the portable electronic device 100. The rear guide part 40, as shown in FIGS. 1 and 6, is joined at the rear of the placement part 20, projects out upward from the top surface of the placement part 20, and is formed into a flat plate shape. In the present embodiment, the rear guide part 40 extends upward up to a height the same as the front guide part 30. However, the height of the rear guide part 40 may be lower than or higher than the front guide part 30. The length of the rear guide part 40 in the left-right direction is the same as the length of the placement part 20 in the left-right direction.

Further, the rear guide part 40, as shown in FIG. 6, extends in parallel with the front guide part 30. Therefore, the distance between the back surface of the front guide part 30 and the front surface of the rear guide part 40 is constant. This distance is equal to the width of the placement part 20 in the front-back direction, and is slightly larger than the width of the portable electronic device 100.

The rear guide part 40, as shown in FIG. 8, is provided with a pair of first air vent openings 41. The first air vent openings 41 are used for making air circulate through the rear guide part 40 to cool the portable electronic device 100. The first air vent openings 41 are arranged at positions at least partially facing the device air vent openings 106 of the portable electronic device 100 when the portable electronic device 100 is held by the main body 10.

Note that, if the main body 10 holds the portable electronic device 100 so as to extend in a direction having an angle with respect to the direction vertical to the placement surface, the rear guide part 40 may also extend to the front or the rear at a slant from the direction perpendicular to the placement surface in accordance with the holding angle. Further, the length of the rear guide part 40 in the left-right direction may be longer than or shorter than the length of the placement part 20 in the left-right direction.

The block mounting part 50 is a part of the main body 10 to which the swivel block 60 is attached. In the present embodiment, the block mounting part 50, as shown in FIGS. 1 and 6, is arranged at the rear of the rear guide part 40. The block mounting part 50, as shown in FIG. 3, is provided with an abutting wall 51 abutting against the swivel block 60, and side walls 52 joined with the abutting wall 51 and surrounding the outer circumference of the swivel block 60.

The abutting wall 51, as shown in FIG. 7, is formed in a flat plate shape so as to extend in parallel with the rear guide part 40 at the rear of the rear guide part 40. Further, in the present embodiment, as shown in FIG. 7, the abutting wall 51 is provided at its outer circumference with a ring-shaped spacer 51a extending from the abutting wall 51 to the front. Therefore, in the present embodiment, between the rear guide part 40 and the abutting wall 51, a space is formed. Note that, the spacer 51a may be formed in any shape so long as at least part of the location between the rear guide part 40 and the abutting wall 51 is formed with a space through which the later explained internal wiring 82 passes, or may be provided at the rear guide part 40. Further, the abutting wall 51 need not be provided with the spacer 51a. Accordingly, a space need not be formed between the rear guide part 40 and the abutting wall 51. Further, the abutting wall 51, as shown in FIG. 7, is provided with the pair of the second air vent openings 54 and the first insertion opening 55.

The second air vent openings 54 are used for making air flow through the abutting wall 51 to cool the portable electronic device 100. The second air vent openings 54, as shown in FIGS. 3 and 4, are provided at the abutting wall 51 so that when the swivel block 60 is attached to the block mounting part 50, they are positioned respectively at the right side and the left side of the swivel block 60 (the two sides in the lateral direction). In the present embodiment, one each second air vent opening 54 is provided at the abutting wall 51 at each of the two sides of the swivel block 60 in the lateral direction. In particular, the second air vent openings 54 are provided at positions respectively corresponding to the first air vent openings 41 provided at the rear guide part 40. Specifically, the second air vent openings 54 are provided at positions facing the corresponding first air vent openings 41. In particular, in the present embodiment, the second air vent openings 54 are provided at positions where they are not blocked by the swivel block 60 when the swivel block 60 is at the later explained first swivel position and second swivel position, but they are partially blocked by the swivel block 60 when the swivel block 60 is at a position during swiveling other than the first swivel position and second swivel position. Due to these first air vent openings 41 and the second air vent openings 54, air can flow through the rear guide part 40 and abutting wall 51 and accordingly the portable electronic device 100 can be cooled. In particular, in the present embodiment, these first air vent openings 41 and second air vent openings 54 are arranged so as to overlap the device air vent openings 106, when viewed from the rear, in the state where the portable electronic device 100 is held by the main body 10, therefore the portable electronic device 100 can be cooled more efficiently. Further, these first air vent openings 41 and second air vent openings 54 are provided at the abutting wall 51 respectively at the two sides of the swivel block 60 in the lateral direction, therefore it is possible to cool the portable electronic device 100 overall in the left-right direction.

Note that, the second air vent openings 54 may be positioned so that they are not blocked by the swivel block 60 no matter what swivel position the swivel block 60 is at. Due to this, even during swiveling of the swivel block 60 or if the swivel block 60 is maintained at a position other than the first swivel position and second swivel position, it is possible to make the cooling ability of the portable electronic device 100 high.

Figure 10:
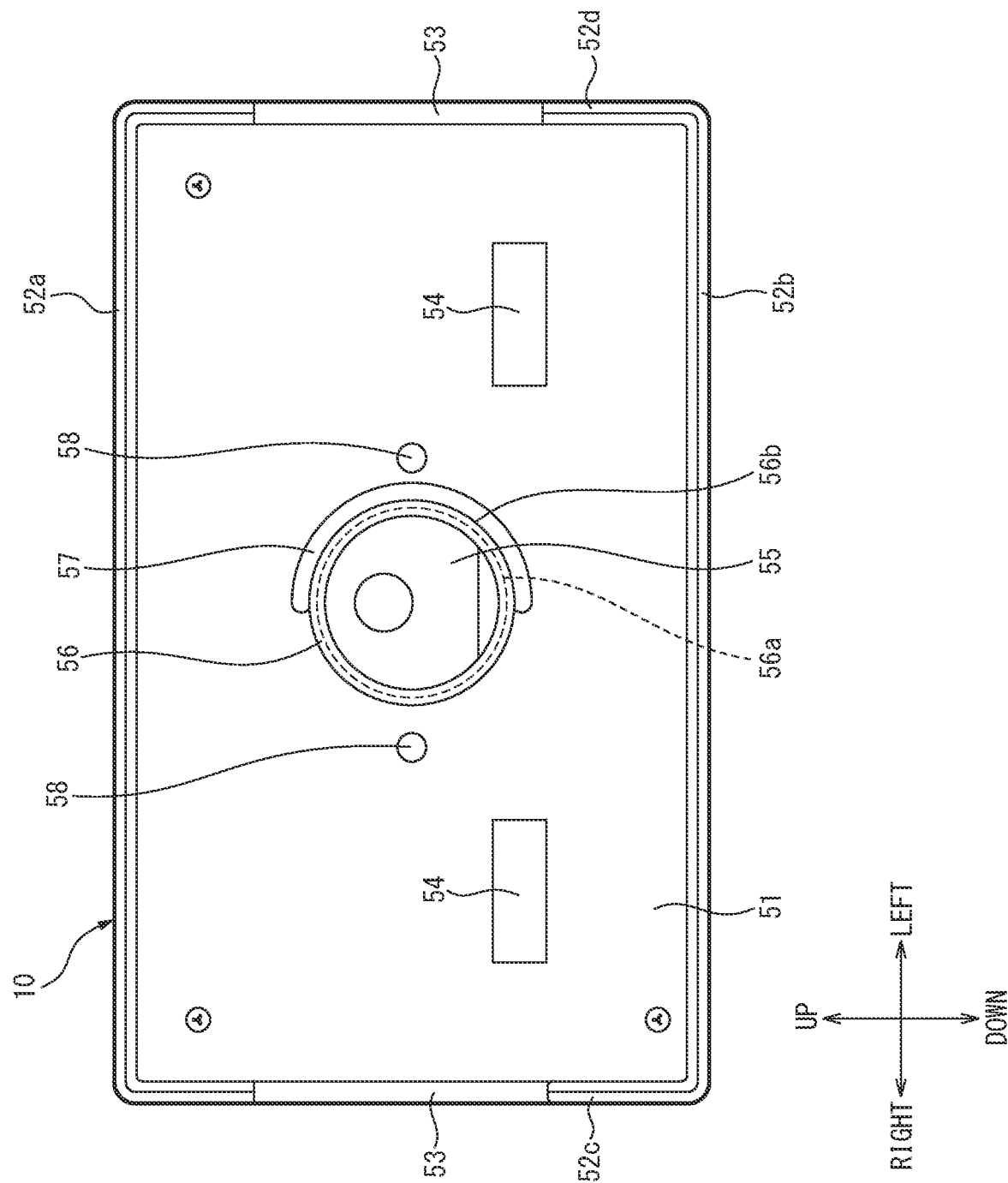
FIG. 10 is a back surface view of a main body in a state where the swivel block is detached.

The first insertion opening 55 is used for insertion of the internal wiring 82. In the present embodiment, the first insertion opening 55, as shown in FIGS. 7 and 10, is a circular opening provided at the center of the abutting wall 51 and passing through the abutting wall 51. In the present embodiment, the first insertion opening 55 is arranged around the swivel axis X forming the center of swiveling of the swivel block 60. The center of the first insertion opening 55 is positioned on the swivel axis X.

As shown in FIG. 3, the side walls 52 extend over predetermined lengths from the abutting wall 51 to the rear at the outer circumference of the abutting wall 51. The side walls 52 are provided with an upper side wall 52a extending from the top end of the abutting wall 51 to the rear, a lower side wall 52b extending from the bottom end of the abutting wall 51 to the rear, a right side wall 52c extending from a right end of the abutting wall 51 to the rear, and a left side wall 52d extending from a left end of the abutting wall 51 to the rear. The upper side wall 52a and the lower side wall 52b are respectively arranged above and below the swivel block 60. The right side wall 52c and the left side wall 52d (these being referred to together as the "lateral side walls") are respectively arranged at the right and left of the swivel block 60 (that is, the two sides of the swivel block 60 in the lateral direction).

As shown in FIGS. 3, 4, and 6, the right side wall 52c and the left side wall 52d are provided, near the center in the up-down direction, with side wall openings 53 for passage of cables connected with the external connectors 81 (explained later) of the swivel block 60. In the present embodiment, the side wall openings 53 extend from the rear ends of the right side wall 52c and the left side wall 52d toward the front, and therefore open to the rear. Further, in the present embodiment, the side wall openings 53 are arranged so that, when seen from the lateral direction as shown in FIG. 6, the swivel block 60 overlaps the side wall openings 53. In addition, in the present embodiment, the side wall openings 53 are formed so that the lengths in the up-down direction are the same extents or shorter than the length of the swivel block 60 in the up-down direction. In particular, in the present embodiment, the side wall openings 53 provided at the two lateral side walls 52c and 52d are arranged at approximately the same positions of the two lateral side walls 52c and 52d in the up-down direction and have substantially the same shapes. Therefore, in the present embodiment, the side wall openings 53 of the pair of lateral side walls 52c and 52d have substantially symmetric shapes about the center of the pair of lateral side walls 52c and 52d (center flat surface). By the right side wall 52c and the left side wall 52d having such side wall openings 53, it is possible to lay the cables connected to the external connectors 81 without bending them. In the present embodiment, the side wall openings 53 are formed as notches open to the rear, but may also be formed as holes with completely closed peripheries.

Note that, the block mounting part 50 may be provided with a lid covering the rear part of the block mounting part 50. In this case, for example, the top end part (or bottom end part) of the lid is coupled by hinges with the upper side wall 52a (or lower side wall 52b) at a plurality of locations, and accordingly the lid opens and closes in the up-down direction. Alternatively, the right end part of the lid (or left end part) is coupled by hinges with the right side wall 52c (or left side wall 52d) at a plurality of locations. Accordingly, the lid opens and closes in the left-right direction. By providing such a lid, force from the outside is prevented from being accidentally applied to the movable part of the swivel block 60 and, further, the appearance of the rear side of the main body 10 can be made neat.

Note that, in the present embodiment, the main body 10, roughly divided, is comprised of four members as shown in FIGS. 1, 3, and 7 such as the first member 11, second member 12, third member 13, and fourth member 14. As shown in FIG. 7, the first member 11 is formed from two members 11a and 11b and forms the front guide part 30. The second member 12 forms the placement wall 21 of the placement part 20. Further, the third member 13 forms the lower housing 22 of the placement part 20, the rear guide part 40, and part of the side walls 52 of the block mounting part 50. Further, the fourth member 14 forms part of the abutting wall 51 of the block mounting part 50 and the side walls 52 of the block mounting part 50. In particular, in the present embodiment, the rear part of the third member 13 is formed into an open box shape, while the fourth member 14 is formed in an open box shape so as to be contained in the rear part of the third member 13 in a nested manner.

Further, in the present embodiment, the two lateral side surfaces of the main body 10 are defined by the lateral side surfaces of the lower housing 22 of the placement part 20, the lateral side surfaces of the front guide part 30, the lateral side surfaces of the rear guide part 40, and the lateral side walls 52c and 52d of the block mounting part 50. Further, the front side surface of the main body 10 is defined by the front surface of the front guide part 30, while the back side surface of the main body 10 is defined by the back surface of the block mounting part 50. In this Description, these lateral side surfaces, front side surface, and rear side surface of the main body 10 will be referred to together as the "main body side surfaces". In addition, in the present embodiment, the bottom surface of the main body 10 is defined by the bottom surface of the lower housing 22 of the placement part 20, the bottom surface of the front guide part 30, the bottom surface of the rear guide part 40, and the lower side wall 52b of the block mounting part 50.

Configuration of Swivel Block

Figure 9:
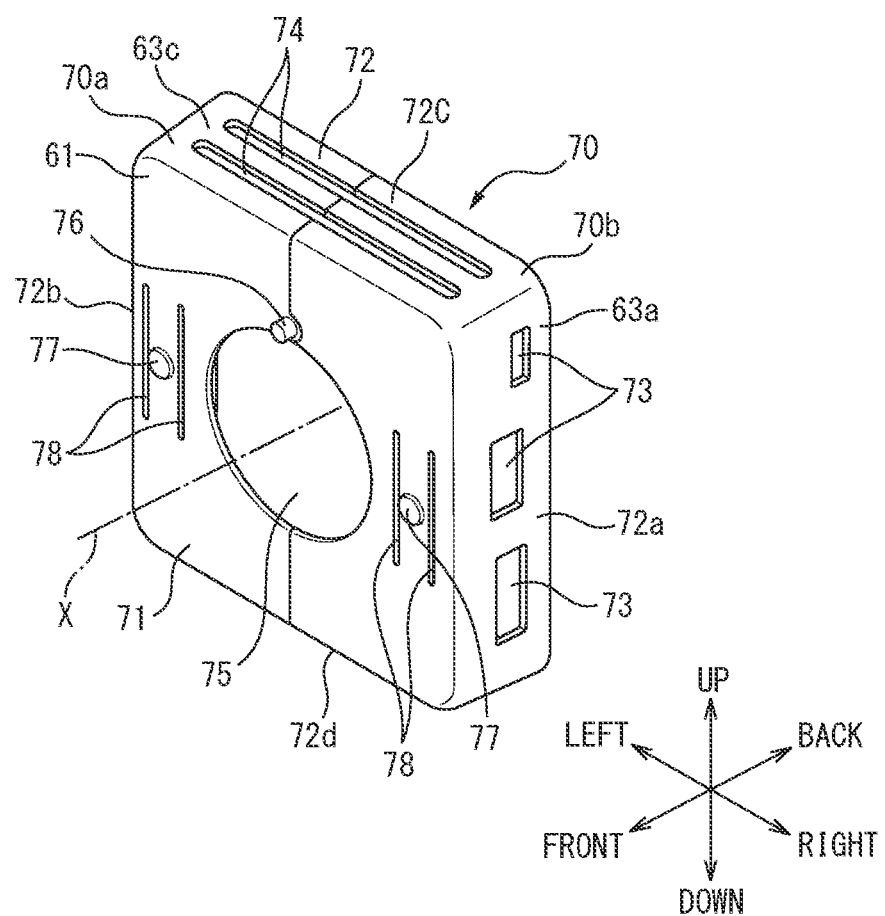
FIG. 9 is a perspective view of a front of an abutting housing of a swivel block seen from above at a slant.

Next, referring to mainly FIGS. 3, 6, 7, and 9, the configuration of the swivel block 60 of the device holder 1 will be explained. FIG. 9 is a perspective view of the front of the abutting housing 70 of the swivel block 60 seen from above at a slant.

As shown in FIG. 3, the swivel block 60 is a block attached to the main body 10 to be able to swivel about the swivel axis X and provided at its side surfaces with the later explained plurality of external connectors 81. In the present embodiment, the swivel axis X extends in the front-back direction (that is, in the horizontal direction with respect to the placement surface), therefore, at least one of the side surfaces of the swivel block 60 face the upward direction. However, for example, if the abutting wall 51 of the block mounting part 50 is slanted with respect to the placement surface, the swivel axis extends in a direction different from the front-back direction corresponding to this slant. Therefore, the swivel axis X can be said to extend in a direction having an angle with respect to the perpendicular line of the placement surface.

In the present embodiment, as shown in FIG. 3, the swivel block 60 is formed in a cuboid shape. In particular, in the present embodiment, the swivel block 60 is formed so that the cross-section perpendicular to the swivel axis X direction (in the present embodiment, the front-back direction) of the swivel block 60 is substantially square. Therefore, the swivel block 60 is provided with a front surface 61 abutting against the abutting wall 51, a back surface 62 provided on an opposite side from the front surface (corresponding to bottom surface of cuboid), and four block side surfaces 63a to 63d between these front surface 61 and the back surface 62 (corresponding to side surfaces of cuboid). The first block side surface 63a and the second block side surface 63b are side surfaces facing opposite directions from each other, while the third block side surface 63c and the fourth block side surface 63d are side surfaces perpendicular to the first block side surface 63a and the second block side surface 63b and facing opposite directions from each other.

However, the swivel block 60 does not necessarily have to be formed into such a shape. For example, it may be formed by a prism shape other than a cuboid or other shape. In the present embodiment, the swivel block 60, when viewed from the front-back direction, is formed so as to always fit inside the main body 10 regardless of the swivel state of the swivel block 60 (that is, so that the outside shape of the swivel block 60 is smaller than the outside shape of the main body 10).

Further, in the present embodiment, the swivel block 60, as shown in FIG. 3, is attached to the main body 10 so that the swivel axis X extends through the center of the main body 10 in the up-down direction and through the center in the left-right direction. However, the swivel block 60 may be attached to the main body so that the swivel axis X extends through a position different from the center of the main body 10 in the up-down direction and/or a position different from the center of the main body 10 in the left-right direction.

As shown in FIGS. 3 and 7, the swivel block 60 is provided with an abutting housing 70 abutting against the abutting wall 51 of the main body 10, a main board 80 housed in the abutting housing 70, and a lid member 90 covering the rear part of the abutting housing 70.

As shown in FIG. 9, the abutting housing 70 is a part of the swivel block 60 which abuts against the abutting wall 51 of the main body 10 and which swivels with respect to the abutting wall 51. In the present embodiment, the abutting housing 70 is provided with a front wall 71 defining a front surface of the swivel block 60 and side walls 72 defining side surfaces of the swivel block 60.

As shown in FIG. 9, the side walls 72 extend to the rear from the outer circumference of the front wall 71. In the present embodiment, as shown in FIGS. 6 and 7, the side walls 72 of the abutting housing 70 are formed so that the widths in the front-back direction (that is, the widths of the direction perpendicular to the front wall 71) are larger than the widths of the side walls 52 of the block mounting part 50 from the abutting wall 51 to the rear end. Therefore, in the present embodiment, the rear end of the swivel block 60 projects out to the rear from the rear end of the device holder 1 (that is, the rear end of the side walls 52 of the block mounting part 50).

Note that, the side walls 72 may also be formed so that the widths in the front-back direction is smaller than the widths of the side walls 52 of the block mounting part 50 from the abutting wall 51 to the rear end. In this case, when the block mounting part 50 is provided with a lid covering the rear part of the block mounting part 50, the widths of the side walls 72 of the abutting housing 70 in the front-back direction are set to sizes where the lid and swivel block 60 do not interfere with each other even if the lid is closed. Therefore, in this case, the rear end of the device holder 1 projects out to the rear from the back surface of the swivel block 60. As a result, even if the device holder 1 falls over, force is prevented from being applied from the outside to the movable part of the swivel block 60.

As shown in FIG. 9, the side walls 72 of the abutting housing 70 are provided with the mutually facing pair of the first side wall 72a and the second side wall 72b and the mutually facing pair of the third side wall 72c and the fourth side wall 72d perpendicular to the first side wall 72a and the second side wall 72b. The first side wall 72a to the fourth side wall 72d of the abutting housing 70 respectively define the first block side surface 63a to the fourth block side surface 63d of the swivel block 60.

As shown in FIG. 9, the first side wall 72a and the second side wall 72b are respectively provided with pluralities of connector openings 73. The connector openings 73 have shapes corresponding to the shapes of the corresponding external connectors 81 provided at the main board 80. As shown in FIG. 6, the connector openings 73 are positioned at the front from the rear ends of the side walls 52 of the main body 10. Further, as shown in FIG. 9, at least one of the third side wall 72c and the fourth side wall 72d, not provided with the connector openings 73, is provided with air vent openings 74 for introducing air to the inside of the swivel block 60. In the present embodiment, both of the third side wall 72c and the fourth side wall 72d are provided with pluralities of air vent openings 74 extending in parallel with the front wall 71. Therefore, in the present embodiment, the external connectors 81 are provided at only the two side surfaces at mutually opposite sides of the swivel block 60 (first block side surface 63a and second block side surface 63b). The swivel block 60 is provided with the air vent openings 74 at the two side surfaces not provided with external connectors 81. As a result, air flows through the two facing side surfaces into the swivel block 60, therefore it is possible to efficiently cool the inside of the swivel block 60.

Note that, even if the swivel block 60 is formed in a shape other than the present embodiment (for example, a prism shape other than a cuboid), the connector openings 73 (that is, the later explained external connectors 81) are provided at one side surface of the swivel block 60 and the side surface at the opposite side from this side surface. In addition, the air vent openings 74 may be provided at side surfaces not provided with connector openings 73, that is, the side surfaces not provided with external connectors 81.

The front wall 71 abuts against the abutting wall 51 of the main body 10. As shown in FIG. 9, the front wall 71 is formed in a flat plate shape and is provided with a second insertion opening 75 at its center. The second insertion opening 75 is used for insertion of the internal wiring 82. In the present embodiment, the second insertion opening 75 is a circular opening provided at the center of the front wall 71 and running through the front wall 71. Therefore, in the present embodiment, the second insertion opening 75 is arranged around the swivel axis X and the center of the second insertion opening 75 is positioned on the swivel axis X. In other words, the second insertion opening 75 is arranged at the center between the pair of the first side wall 72a and the second side wall 72b where the connector openings 73 are provided. In the present embodiment, the second insertion opening 75 is formed slightly larger than the first insertion opening 55 of the abutting wall 51.

Further, as shown in FIG. 9, in the present embodiment, the abutting housing 70 is formed from two half members 70a and 70b split at the plane passing through the center of the second insertion opening 75. Specifically, the abutting housing 70 is split into two half members 70a and 70b along a plane parallel to the first side wall 72a and the second side wall 72b. In the present embodiment, the first half member 70a is provided with the first side wall 72a and the second half member 70b is provided with the second side wall 72b. These first half member 70a and second half member 70b are fastened to each other by screws or other fasteners, etc., to form the abutting housing 70.

Figure 15A:
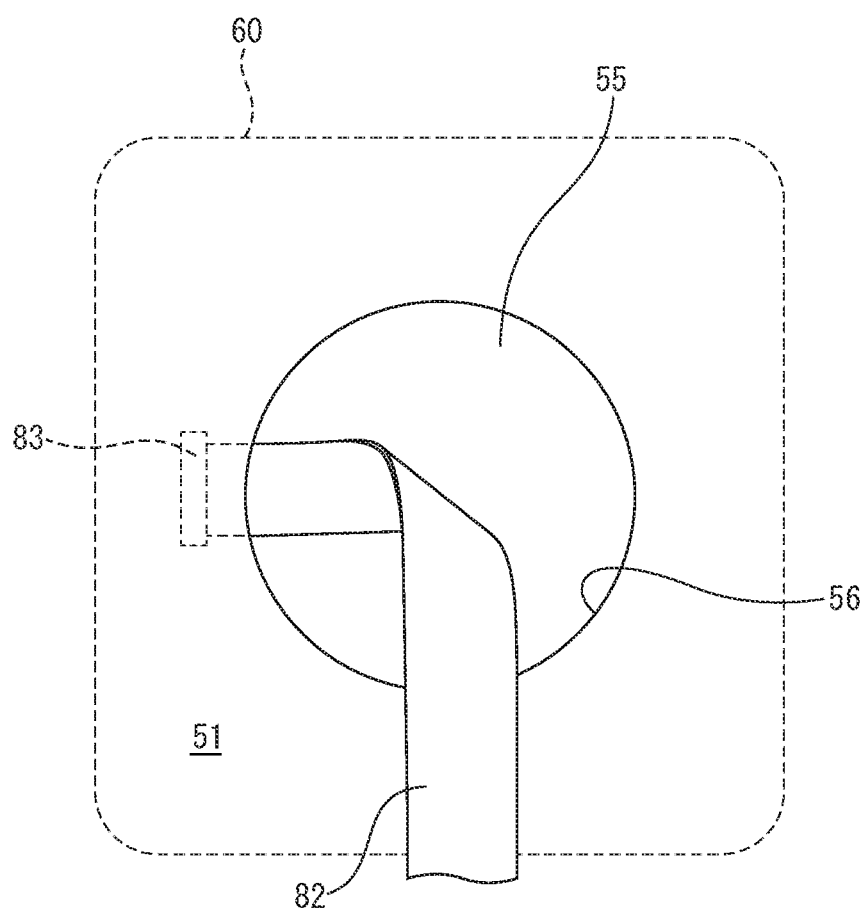
FIG. 15A to FIG. 15E are front views of an abutting wall in which a vicinity of a first insertion opening of FIG. 14 is enlarged.

As shown in FIG. 15A, the main board 80 is equipped with the second input/output connector 83 to which the internal wiring 82 is connected and is equipped with a plurality of external connectors 81. The main board 80 performs input/output of data and transmission of electric power between the internal wiring 82 and the external connectors 81. Further, at the main board 80, when inputting and outputting data, the data may be processed in any way.

The main board 80 is housed inside the abutting housing 70. In the present embodiment, the main board 80 is arranged away from the front wall 71 in parallel with the front wall 71. In particular, in the present embodiment, the main board 80 is arranged at a position closer to the lid member 90 than the front wall 71, that is, is arranged closer to the rear end than the front ends of the side walls 72.

The internal wiring 82 performs input/output of data and transmission of electric power, between the main board 80 and the connector board 23, in the device holder 1. As shown in FIGS. 7 and 15A, the first wiring connector 82a provided at one end part of the internal wiring 82 is connected to the second input/output connector 83 of the main board 80 and accordingly is connected to the external connectors 81 through the main board 80. Further, as shown in FIG. 7, the second wiring connector 82b provided at the other end part of the internal wiring 82 is connected to the first input/output connector 23a of the connector board 23, and accordingly is connected to the main body connector 24 through the connector board 23. In the present embodiment, the internal wiring 82 is for example a FPC (flexible printed circuit) or FFC (flexible flat cable) or other flat wiring.

The second input/output connector 83 is a connector for connecting the internal wiring 82 to the main board 80. In the present embodiment, the second input/output connector 83 is arranged on the surface of the main board 80 facing the front wall 71. The second input/output connector 83, as will be understood from FIG. 15A, is arranged offset from the swivel axis X. Further, the second input/output connector 83 is formed so that the internal wiring 82 extends along the surface of the main board 80 at the front wall 71 side toward the swivel axis X when the internal wiring 82 is connected to the second input/output connector 83.

Note that, the second input/output connector 83 may be arranged on the surface of the main board 80 facing the lid member 90. In this case, the second input/output connector 83, for example, is formed so that when the internal wiring 82 is connected to the second input/output connector 83, the internal wiring 82 extends along the surface of the main board 80 at the lid member 90 side in a direction away from the swivel axis X. Further, the internal wiring 82 is bent 180° at the side of the main board 80 from the surface of the main body 80 at the lid member 90 side, and extends on the surface of the main board 80 at the front wall 71 side toward the swivel axis X. Therefore, in this case as well, the internal wiring 82 extends along the surface of the main board 80 facing the front wall 71 toward the swivel axis X at a position offset from the swivel axis X.

The external connectors 81 are connectors for connecting the device holder 1 to outside devices or a power source. Therefore, the external connectors 81 are connected to the connectors of cables connected to outside devices or a power source. In the present embodiment, these external connectors 81 are formed as female connectors. As shown in FIG. 3, the external connectors 81 are arranged so that their inlets form the first block side surface 63a and the second block side surface 63b of the swivel block 60. In the present embodiment, three external connectors 81 are arranged at positions corresponding to the connector openings 73 of the first side wall 72a of the abutting housing 70 so as to face the first block side surface 63a. Further, two external connectors 81 are arranged at positions corresponding to the connector openings 73 of the second side wall 72b so as to face the second block side surface 63b.

In the present embodiment, as shown in FIG. 3, the first block side surface 63a is provided with an external connector for power supply 81a, an external connector for video output 81b, and an external connector for data input/output 81c. In particular, in the present embodiment, the external connector for power supply 81a and the external connector for video output 81b are provided at only the first block side surface 63a. On the other hand, as shown in FIG. 13, the second block side surface 63b side is provided with external connectors 81d and 81e for data input/output.

The external connector for power supply 81a is used for transmitting electric power for charging the portable electronic device 100. The external connector for power supply 81a is connected through a power cable (not shown) to a power connector of the building, etc. As the external connector for power supply 81a, for example, a female connector complying with a general standard or a female connector complying with individual standards is used.

The external connector for video output 81b is used for outputting video data (including case of outputting both video data and audio data) to a television receiver, video monitor, projector, or other external video display device (in particular, a stationary video display device). In particular, in the present embodiment, the external connector for video output 81b outputs video data to an external video display device based on data input through the main body connector 24 of the portable electronic device 100 and transmitted through the connector board 23, the internal wiring 82, and the main board 80. Therefore, the external connector for video output 81b is connected to the external video display device through a transfer cable. As the external connector for video output 81b, for example, a female connector complying with the HDMI®, DisplayPort, DVI, or other general standard is used.

The external connectors for data input/output 81c to 81e are used for input/output of operation signals with a controller, keyboard, or other separate operation input/output device. In particular, in the present embodiment, the operation signals from separate operation input/output devices input through the external connectors 81c to 81e are input/output through the main board 80, internal wiring 82, and connector board 23 and input to the portable electronic device 100 by the main body connector 24. Further, the external connectors 81 for data input/output may also be used for input/output of signals with the separate operation input/output device or for transmitting electric power. Therefore, the external connectors for data input/output 81c to 81e are connected through input/output cables to the separate operation input/output device. As the external connector for data input/output 81c, for example, a female connector based on the USB, Thunderbolt, or other general standard is used.

Further, in the present embodiment, the first block side surface 63a of the swivel block 60 is provided with at least three external connectors 81 including an external connector for power supply 81a, external connector for video output 81b, and external connector 81c for data input/output. The external connector 81c for data input/output is arranged at the end of these external connectors 81a, 81b, and 81c.

Note that, even if the swivel block 60 is formed into a shape other than the present embodiment (for example, a prism shape other than a cuboid), the external connector for power supply 81a and the external connector for video output 81b are provided at one side surface of the swivel block 60. Further, the external connectors for data output are provided at least at a side surface and the side surface at the opposite side as this side surface.

The lid member 90, as shown in FIGS. 4 and 7, is formed so as to cover the entire opening at the rear side of the abutting housing 70. The lid member 90 is, for example, fastened to the abutting housing 70 by bolts or other fasteners or fastening tabs, etc. The lid member 90 may be provided with openings for air ventilation.

Swivel Mechanism

Figure 11:
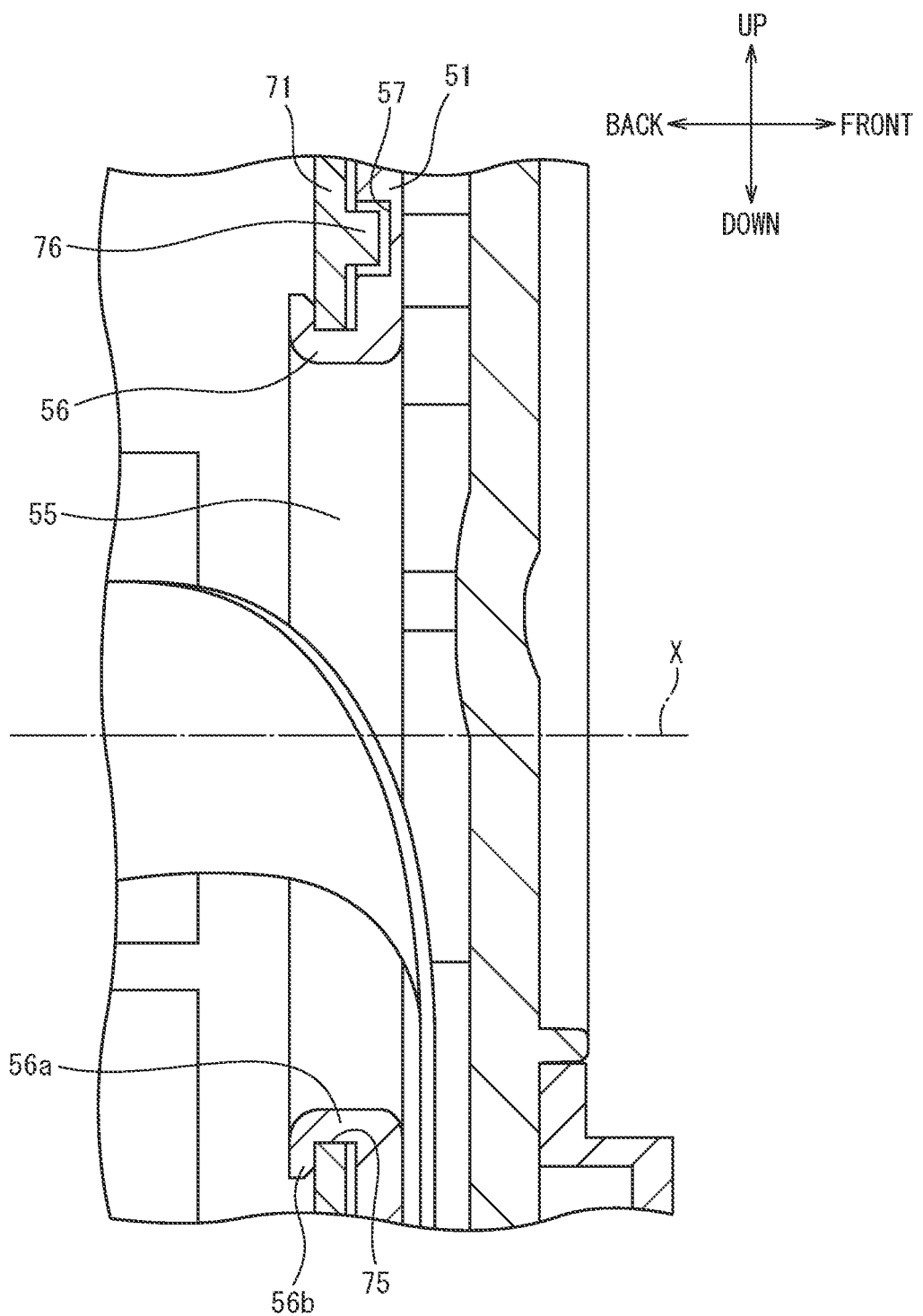
FIG. 11 is a cross-sectional side surface view of the device holder enlarging a vicinity of a second insertion opening of FIG. 7.
Figure 14:
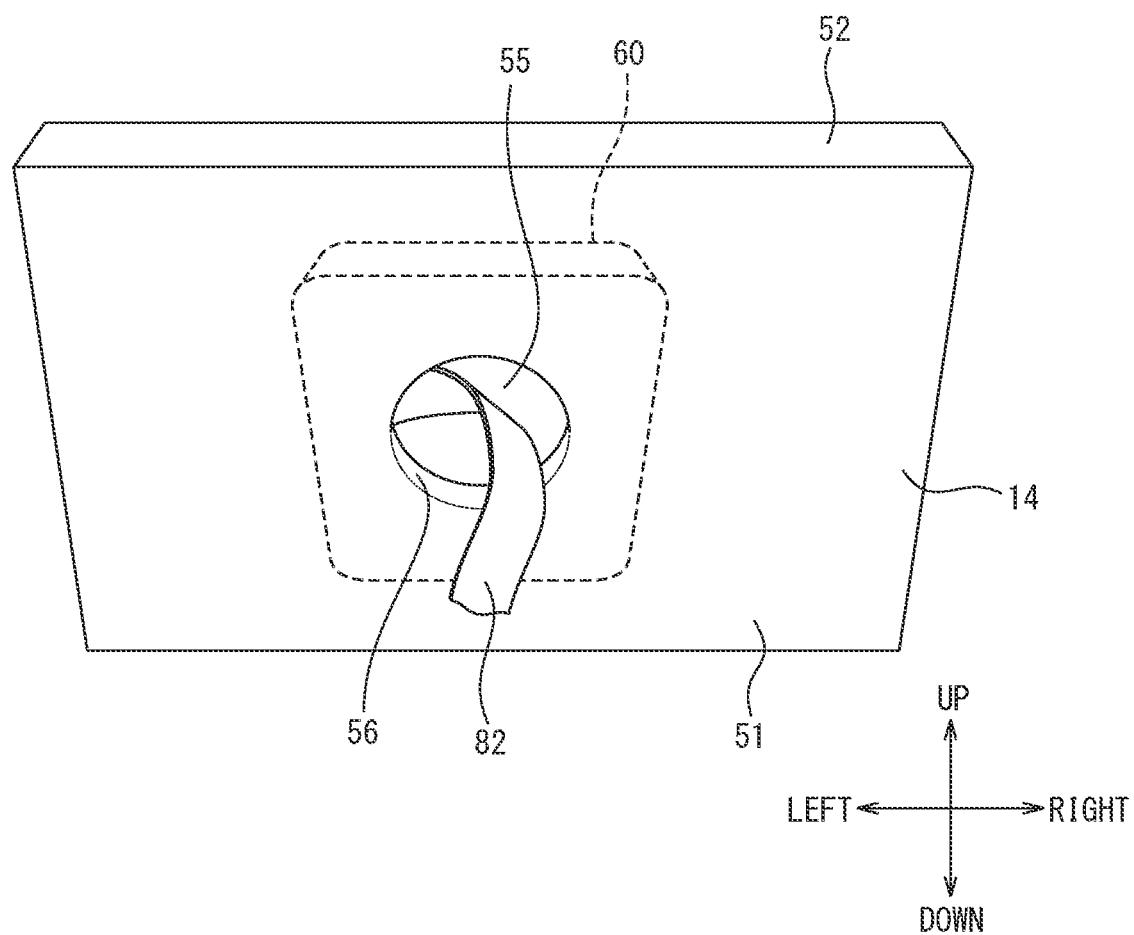
FIG. 14 is a perspective view of the abutting wall of a block mounting part seen from the front.

Next, referring to FIGS. 7 and 9 to 13, a swivel mechanism of the swivel block 60 will be explained. FIG. 10 is a back surface view of the main body 10 in a state detaching the swivel block 60. FIG. 11 is a cross-sectional side surface view of the device holder 1 enlarging a vicinity of the second insertion opening 75 of FIG. 7. Further, FIGS. 12 and 13 are perspective views, similar to FIG. 3, of a back surface of the device holder 1 seen from above at a slant. FIG. 12 shows the state where the swivel block 60 is made to swivel 45° from the state shown in FIG. 3, while FIG. 13 shows the state where the swivel block 60 is made to swivel 180° from the state shown in FIG. 3. FIG. 14 is a perspective view of the abutting wall 51 of the block mounting part 50 (in particular, the fourth member 14) seen from the front. In FIG. 14, the swivel block 60 is drawn by broken lines.

The front wall 71 of the swivel block 60, as shown in FIG. 9, is provided with, as a swivel mechanism, a first projection 76 and a pair of second projections 77 provided around the second insertion opening 75.

The first projection 76 projects out from the front wall 71 toward the front. In the present embodiment, the first projection 76 is formed in a columnar shape. The first projection 76 is formed to be able to enter into an arc shaped groove 57 (explained later) provided at the abutting wall 51 and slide in the arc shaped groove 57. Therefore, it is formed so that the diameter is smaller than the width of the arc shaped groove 57. Further, the first projection 76 is provided at the center between the first side wall 72a and the second side wall 72b.

The pair of second projections 77 also project out from the front wall 71 toward the front. In the present embodiment, the second projections 77 are also formed in columnar shapes. However, in the present embodiment, the second projections 77 are formed lower than the first projection 76. The second projections 77 are formed so as to fit in fitting grooves 58 (explained later) provided at the abutting wall 51 when the swivel block 60 is at a predetermined swivel position. Therefore, the second projections 77 are formed into complementary shapes with the fitting grooves 58. The pair of second projections 77 are arranged symmetrically with respect to each other about the swivel axis X of the swivel block 60. Around the second projections 77, as shown in FIG. 9, a pair of parallel straight line through-slots 78 are formed. By through-slots 78 being provided in this way, the parts of the front wall 71 around the second projections 77 is easy to elastically deform so that the positions of the second projections 77 change in the front-back direction. As a result, the second projections 77 can be pulled out from the fitting grooves 58 when force in the swivel direction is applied to the swivel block 60 in the state where the second projections 77 are fit into the fitting grooves 58.

Note that, in the present embodiment, the front wall 71 of the swivel block 60 is formed elastically by the provision of the through-slots 78 so as to enable the second projections 77 to be pulled out from the fitting grooves 58. However, another method may also be used to make the second projections 77 able to be pulled out from the fitting grooves 58. Specifically, for example, the second projections 77 may be formed by elastic members.

Further, the abutting wall 51 of the block mounting part 50, as shown in FIGS. 7, 10, and 11, is provided with, as the swivel mechanism, a block support part 56, arc shaped groove 57, and the fitting grooves 58.

The block support part 56 is used for supporting the swivel block 60 to be able to swivel. As shown in FIGS. 7 and 10, the block support part 56 is provided with a cylindrical part 56a which is joined with the abutting wall 51 and extends from the abutting wall 51 to the swivel block 60, and with a flange part 56b which is joined with an end part of the cylindrical part 56a.

As shown in FIGS. 7 and 11, the cylindrical part 56a is arranged at the center of the back surface of the abutting wall 51 around the second insertion opening 75. Further, the cylindrical part 56a is arranged so that its axis is coaxial with the swivel axis X. In the present embodiment, the cylindrical part 56a is formed so that its inside diameter is equal to the radius of the first insertion opening 55 and so that it is coaxial with the first insertion opening 55. In addition, the cylindrical part 56a is formed so that its outside diameter is slightly smaller than the second insertion opening 75 of the front wall 71 (FIG. 9). Furthermore, the cylindrical part 56a is formed so that its length in the front-back direction is slightly longer than the thickness of the front wall 71 of the swivel block 60.

As shown in FIGS. 7 and 11, the flange part 56b is joined with the rear end of the cylindrical part 56a so that it projects out from the end part of the cylindrical part 56a to the outer circumferential direction. Therefore, the flange part 56b is provided with an inside diameter the same as the cylindrical part 56a and an outside diameter larger than the cylindrical part 56a and larger than the radius of the second insertion opening 75 of the front wall 71.

As shown in FIG. 10, the arc shaped groove 57 is a groove inside of which the first projection 76 of the swivel block 60 slides. The arc shaped groove 57 is an arc shaped groove provided at the back surface of the abutting wall 51, and extends around the block support part 56 about the swivel axis X over approximately 180°. In particular, the arc shaped groove 57 is arranged at a position where the first projection 76 moves when the swivel block 60 swivels. Therefore, the arc shaped groove 57 is formed so that the distance from the swivel axis X is equal to the distance from the first projection 76 to the center of the second insertion opening 75. In particular, in the present embodiment, the arc shaped groove 57 extends from the vicinity of the top end of the second insertion opening 75 to the vicinity of the bottom end of the second insertion opening 75. Note that, in the present embodiment, the abutting wall 51 is provided with an arc shaped groove 57 not passing through the abutting wall 51, but instead of the arc shaped groove 57, an arc shaped opening passing through the abutting wall 51 may be provided.

As shown in FIG. 10, the pair of fitting grooves 58 are circular grooves provided in the back surface of the abutting wall 51. The pair of fitting grooves 58 are arranged around the block support part 56 at symmetric positions with respect to each other about the swivel axis X. In other words, the pair of fitting grooves 58 are arranged at positions 180° apart from each other about the swivel axis X. In the present embodiment, the fitting grooves 58 are formed in columnar shapes complementary with the corresponding second projections 77, and are formed so that the second projections 77 fit into them when the swivel block 60 is at predetermined swivel positions. Note that, the second projections 77 and fitting grooves 58 need not be circular shapes so long as complementary shapes in which the second projections 77 fit inside the fitting grooves 58. Note that, in the present embodiment, the abutting wall 51 is provided with fitting grooves 58 not passing through the abutting wall 51, but instead of the fitting grooves 58, fitting openings passing through the abutting wall 51 may also be provided.

In the thus configured block mounting part 50 and swivel block 60, the swivel block 60, as shown in FIG. 11, is arranged so that the circular edge part around the second insertion opening 75 of the front wall 71 fits in the groove, around the cylindrical part 56a, defined by the abutting wall 51, cylindrical part 56a, and flange part 56b. The circular edge part around the second insertion opening 75 of the front wall 71 slides inside this groove whereby the swivel block 60 swivels with respect to the main body 10. In particular, the swivel block 60 is attached to the main body 10 to be able to swivel about the axis of the second insertion opening 75 and the axis of the cylindrical part 56a as the swivel axis X.

Further, in the present embodiment, when attaching the abutting housing 70 to the block mounting part 50, the half members 70a and 70b of the abutting housing 70 are arranged around the block support part 56 so that the semicircular edge parts forming the second insertion opening 75 of the half members 70a and 70b fit into the groove of the block support part 56. After that, these half members 70a and 70b are combined, then these half members 70a and 70b are fastened with each other by screws or other fasteners. By doing this, it is possible to attach the abutting housing 70 to the block mounting part 50 to be able to swivel and accordingly possible to attach the swivel block 60 to the main body 10 to be able to swivel. Therefore, according to the present embodiment, it is possible to attach the swivel block 60 to the main body 10 to be able to swivel by a simple mechanism.

Note that, in the present embodiment, as shown in FIG. 9, the surface of the swivel block 60 facing the main body 10 is provided with the first projection 76. As shown in FIG. 10, the surface of the main body 10 facing the swivel block 60 is provided with the arc shaped groove 57 where the first projection 76 slides. However, the surface of the main body 10 facing the swivel block 60 may be provided with the first projection, and the surface of the swivel block 60 facing the main body 10 may be provided with the arc shaped groove where the first projection slides.

Further, in the present embodiment, as shown in FIG. 9, the surface of the swivel block 60 facing the main body 10 is provided with the second projections 77 and, as shown in FIG. 10, the surface of the main body 10 facing the swivel block 60 is provided with the fitting grooves 58 where the second projections 77 fit. However, the surface of the main body 10 facing the swivel block 60 may be provided with second projections and the surface of the swivel block 60 facing the main body 10 may be provided with fitting grooves where the second projections fit.

Next, referring to FIGS. 3, 12, and 13, the swivel states of the swivel block 60 will be explained. FIG. 3 shows when the swivel block 60 is at the first swivel position. At the first swivel position, the first block side surface 63a of the swivel block 60 provided with the external connector for video output 81b faces the right side surface of the main body 10, while the second block side surface 63b faces the left side surface at the opposite side from the right side surface of the main body 10.

Further, at the first swivel position, the first projection 76 of the swivel block 60 is positioned in the arc shaped groove 57 at the top end. Therefore, at the first swivel position, the first projection 76 is positioned at the end of the arc shaped groove 57 in the circumferential direction, therefore the swivel block 60 cannot swivel further counterclockwise from the position shown in FIG. 3 (in the case seen from the rear such as in FIG. 3) and can swivel only clockwise.

Further, at the first swivel position, the second projections 77 of the swivel block 60 fit in the fitting grooves 58 at respectively corresponding positions. However, as explained above, the second projections 77 are formed to be able to be pulled out from the fitting grooves 58. For this reason, if a large clockwise force is applied to the swivel block 60, the second projections 77 can be pulled out from the fitting grooves 58 and accordingly the swivel block 60 can swivel. Therefore, the swivel block 60 is locked at the first swivel position to an extent where it can swivel if a large force is applied.

In the present embodiment, as shown by the arrow in FIG. 12, if making the swivel block 60 swivel clockwise, the external connector for power supply 81a and external connector for video output 81b will pass above the swivel block 60. Here, sometimes the swivel block 60 is swiveled in the state where cables are connected to the external connector for power supply 81a and external connector for video output 81b. When swiveling the swivel block 60 in the state where the device holder 1 is placed on the placement surface, if the external connector for power supply 81a and video output external connector 81b pass below the swivel block 60, the cables connected to these external connectors 81a and 81b will interfere with the placement surface, during swiveling. As opposed to this, by the swivel block 60 swiveling so that the external connectors 81a and 81b pass above the swivel block 60 like in the present embodiment, the cables connected with these external connectors 81a and 81b are prevented from interfering with the placement surface.

After that, if swiveling the swivel block 60 from the first swivel position clockwise 180°, the swivel block 60 reaches the second swivel position shown in FIG. 13. At the second swivel position, the first block side surface 63a of the swivel block 60 provided with the external connector for video output 81b faces the left side surface of the main body 10, while the second block side surface 63b faces the right side surface of the main body 10.

Further, at the second swivel position, the first projection 76 of the swivel block 60 is positioned at the bottom end of the arc shaped groove 57. Therefore, since the first projection 76 is positioned at the end part of the arc shaped groove 57 in the circumferential direction at the second swivel position, the swivel block 60 cannot swivel further from the position shown in FIG. 13 clockwise and can swivel only counterclockwise. Therefore, in the present embodiment, the swivel block 60 can swivel between the first swivel position and the second swivel position over the amount of angle of the arc shaped groove 57 in the circumferential direction of approximately 180°.

Further, at the second swivel position as well, the second projections 77 of the swivel block 60 fit in the fitting grooves 58 at the corresponding positions. In particular, at the second swivel position, the second projections 77 fit in fitting grooves 58 separate from the first swivel position. By the second projections 77 fitting in the fitting grooves 58 in this way, the swivel block 60 is fastened to the second swivel position so long as not a large enough force is applied to change the positions of the second projections. Therefore, the swivel block 60 is locked at the second swivel position as well to an extent where it can swivel if a large force is applied. Therefore, in the present embodiment, when the swivel block 60 is at the first swivel position and second swivel position, the second projections 77 fit in the fitting grooves 58. Accordingly, so far as no large force is applied, the swivel block 60 is fixed to the first swivel position or second swivel position.

Due to the above, in the present embodiment, the swivel block 60 can swivel between a first swivel position where the side surface provided with the external connector for video output 81b faces one side surface side of the main body 10 (first main body side surface) and a second swivel position where the side surface provided with the external connector for video output 81b faces the side surface (second main body side surface) side at the opposite side from the above one side surface of the main body 10. Changing the way of viewing it, in the present embodiment, the swivel block 60 can swivel between the first swivel position where the side surface provided with the external connector for video output 81b faces one lateral side surface (first lateral side surface) side of the portable electronic device 100 held at the main body 10 and the second swivel position where the lateral side surface (second lateral side surface) provided with the external connector for video output 81b faces one lateral side surface (second lateral side surface) side at the opposite side to the above one lateral side surface of the portable electronic device 100 held at the main body 10.

In this regard, the internal wiring 82, as shown in FIG. 7, is connected at one end part to the first input/output connector 23a of the connector board 23, extends from this end part along the lower housing 22, and extends through the space between the rear guide part 40 and the abutting wall 51 upward. Therefore, the internal wiring 82 is arranged so as to extend inside the main body 10 toward the swivel axis X at a position offset from the swivel axis X downward. Further, as shown in FIG. 14, the internal wiring 82 which had extended inside the main body 10 upward enters inside the swivel block 60 through the first insertion opening 55 and second insertion opening 75.

As explained above, the internal wiring 82 is connected to the second input/output connector 83 of the main board 80 so as to extend inside the swivel block 60 toward the swivel axis X at a position offset from the swivel axis X. Therefore, in the present embodiment, the internal wiring 82, as shown in FIG. 14, is bent inside the first insertion opening 55 and second insertion opening 75.

Figure 15B:
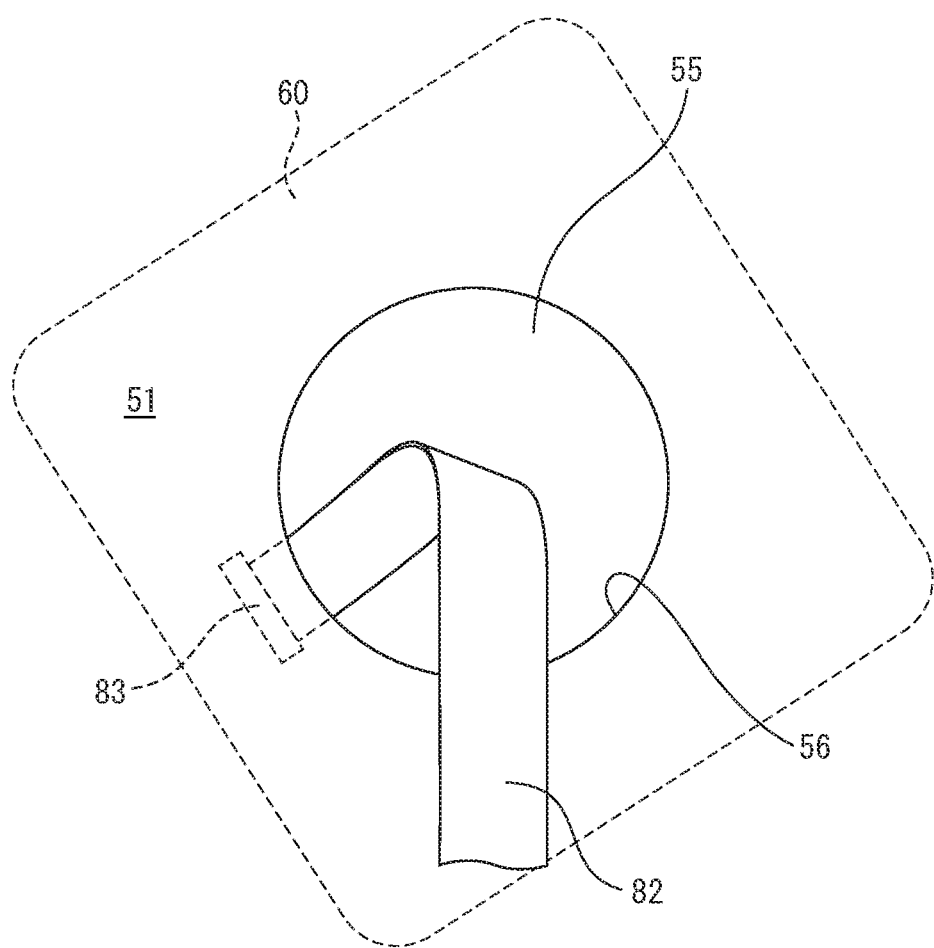
Figure 15C:
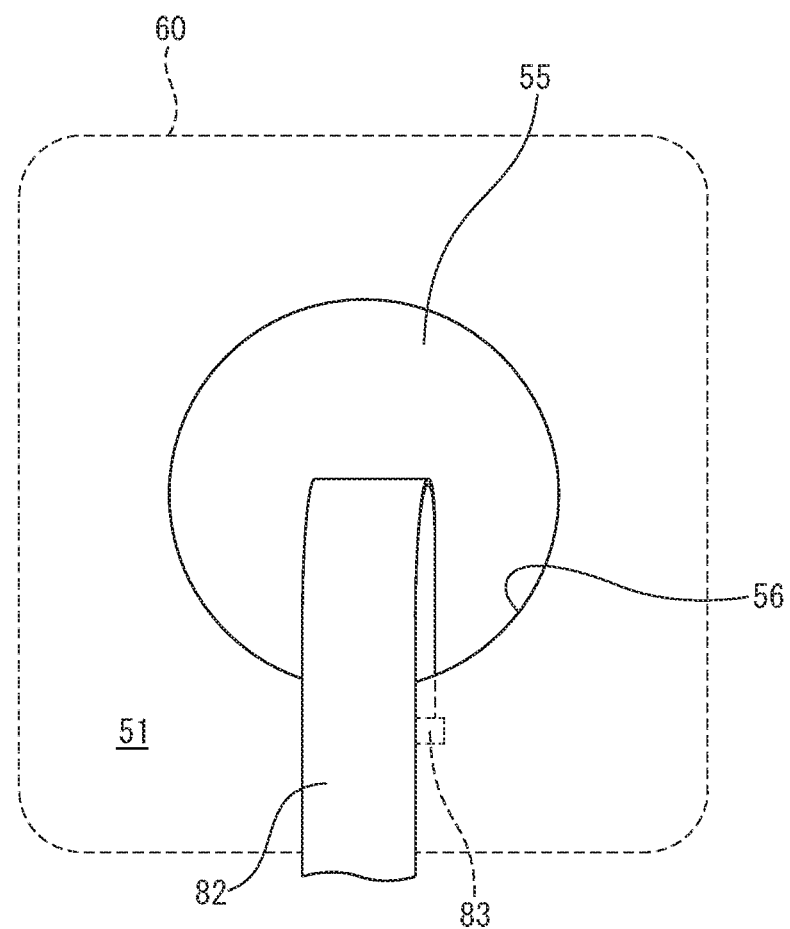
Figure 15D:
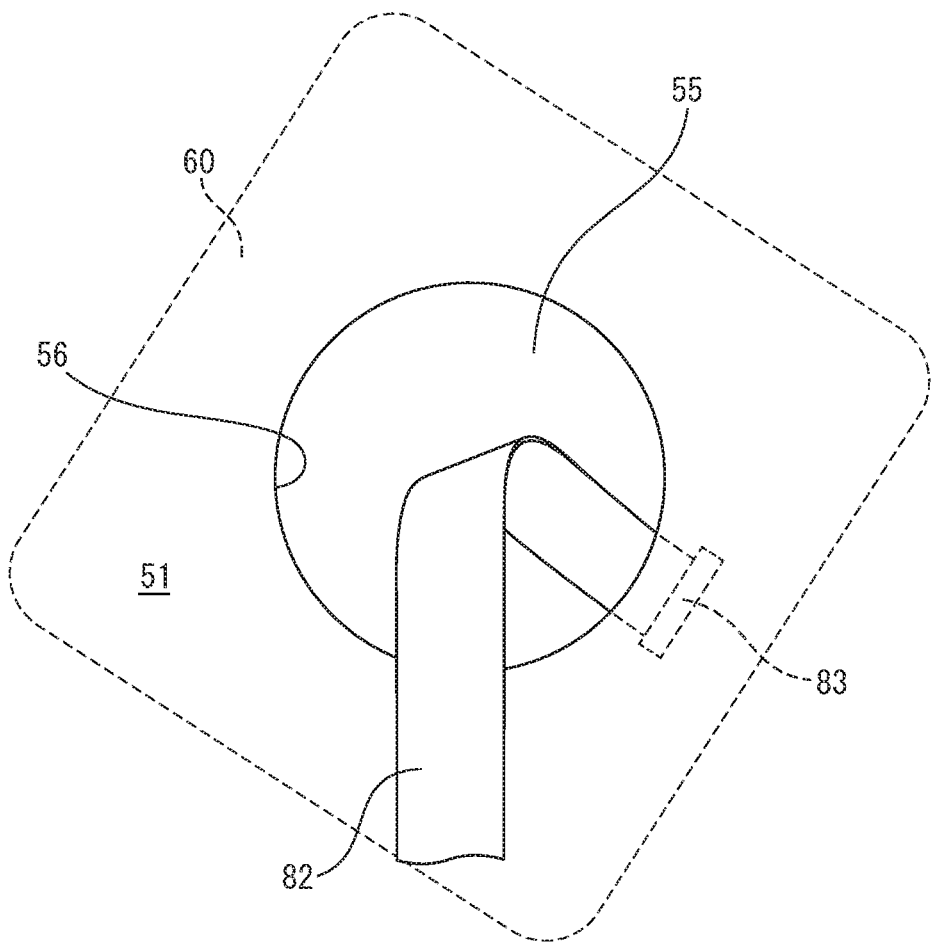
Figure 15E:
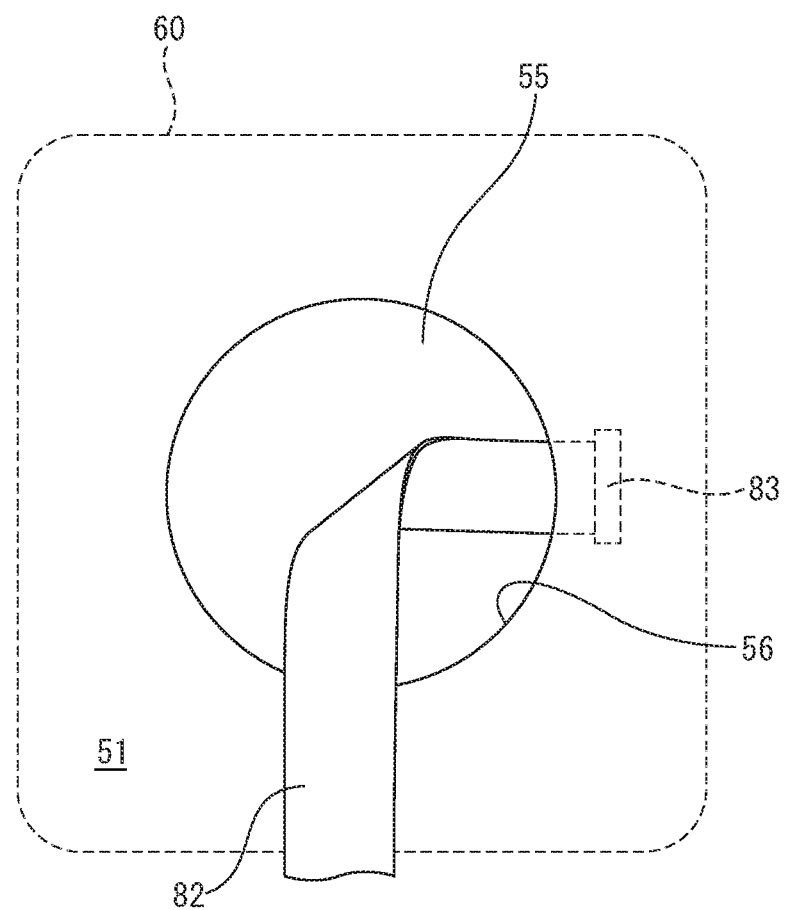

FIGS. 15A to 15E are front views of the abutting wall 51 enlarging the vicinity of the first insertion opening 55 of FIG. 14. FIG. 15A shows the state of the internal wiring 82 when the swivel block 60 is at the first swivel position, while FIG. 15E shows the state of the internal wiring 82 when the swivel block 60 is at the second swivel position. Further, FIGS. 15B, 15C, and 15D show the states of the internal wiring 82 when the swivel block 60 is at positions rotated every 45° from the first swivel position. In particular, at the swivel position shown in FIG. 15C, the internal wiring 82 is bent so as to be folded back without twisting.

As will be understood from FIGS. 15A to 15E, if the swivel block 60 swivels, the internal wiring 82 changes in the way of bending at the first insertion opening 55 and second insertion opening 75. However, the internal wiring 82 passes near the swivel axis X and extends inside the first insertion opening 55 and second insertion opening 75. Further, in the present embodiment, at the swivel position being the intermediate point shown in FIG. 15C (below, referred to as the "intermediate swivel position"), the internal wiring 82 is bent so as to be folded back without twisting. As a result, at the first swivel position shown in FIG. 15A where the swivel block 60 has swiveled 90° to one side from the intermediate swivel position, the internal wiring 82 is in a state with only a 90° twist is given in addition to the folding back at the intermediate swivel position. Even at the second swivel position shown in FIG. 15E where the swivel block 60 has swiveled 90° from the intermediate swivel position to the other side, the internal wiring 82 is in a state where only a 90° twist is given in addition to the folding back at the intermediate swivel position. Therefore, even if the swivel block 60 swivels, the internal wiring 82 will not be twisted that much. Further, in the present embodiment, the main board 80 is arranged at the rear in the swivel block 60 (that is, the opposite side from the abutting wall 51 side of the main body 10), therefore in the vicinity of the first insertion opening 55, there is a space of a certain extent of size in the front-back direction, therefore it is possible to keep the internal wiring 82 from bending by a sharp angle and accordingly keep the load applied to the internal wiring 82 small.

Advantageous Effects

In the device holder 1 according to the present embodiment, it is possible to swivel between the first swivel position where the side surface of the swivel block 60, with which the external connector for video output 81b is provided, faces the first main body side surface side of the main body 10, and the second swivel position where the above side surface of the swivel block 60 faces the second main body side surface side at the opposite side from the first main body side surface side of the portable electronic device 100. Therefore, according to the device holder 1 according to the present embodiment, the cables to be connected to the video display device can be connected to the main body 10 from either main body side surface side of the main body 10. Accordingly, the operation of laying the cables to be connected to the device holder 1 can be kept from being troublesome.

Further, the device holder 1 according to the present embodiment is provided with external connectors 81d and 81e for data input/output able to connect with operation input devices, for example, USB connectors, at the side surface on the opposite side from the side surface where the external connector for video output 81b is provided. Here, the frequency by which connectors for operation input devices are unplugged from and plugged into external connectors 81d and 81e for data input/output is believed to be generally higher than the frequency by which connectors are unplugged from and plugged into the external connector for power supply 81a and external connector for video output 81b. By providing the external connectors with high frequencies of being unplugged from and plugged into them in this way at the opposite sides of the external connectors with low frequencies of being unplugged from and plugged into them, it is possible to optimize the operation of laying of the cables to be connected to the device holder 1.

Further, in the device holder 1 according to the present embodiment, if the first block side surface 63a of the swivel block 60 is provided with equal to or greater than three external connectors 81 including the external connector for power supply 81a, external connector for video output 81b, and an external connector for data input/output 81c, the external connector for data input/output 81c is arranged at the end of these. As explained above, the external connector for data input/output 81c is believed to be generally high in frequency of the connector being unplugged or plugged in. Accordingly, by arrangement at the end of the plurality of external connectors 81, pull-out and plug-in can be easily performed.

In addition, in the device holder 1 according to the present embodiment, the side wall openings 53 provided at the two lateral side walls 52c and 52ds are arranged in the up-down direction at approximately the same positions as the two lateral side walls 52c and 52d and have approximately the same shapes. As a result, no matter which of the first swivel position and second swivel position the swivel block 60 is at, the connectors of the cables can be connected to the external connectors 81 in the same way.

Further, in the device holder 1 according to the present embodiment, the swivel block 60 is attached to the main body 10 so that the swivel axis X extends through the center of the main body 10 (in particular, abutting wall 51) in the up-down direction and the center in the left-right direction. Therefore, the swivel block 60 is arranged so that no matter which swivel position of the first swivel position and second swivel position the swivel block 60 is at, the distances between the side wall openings of the lateral side walls 52c and 52d of the block mounting part 50 and the block side surfaces 63a and 63b of the swivel block 60 facing these side wall openings 53 are approximately equal. For this reason, no matter which position of the first swivel position and second swivel position the swivel block 60 is at, the cables to be connected to the external connectors 81 of the swivel block 60 can be laid under the same conditions. Note that, the swivel block 60 may be attached to the main body 10 so that its swivel axis X is positioned below the center of the main body 10 (in particular, abutting wall 51) in the up-down direction.

Modifications

For example, in the above embodiment, the swivel block 60 is formed so that the magnitude of the outer circumference is smaller than the magnitude of the main body 10. However, the swivel block 60 may be formed so that the outer circumference is the same shape as the outer circumference of the main body 10.

Figure 16:
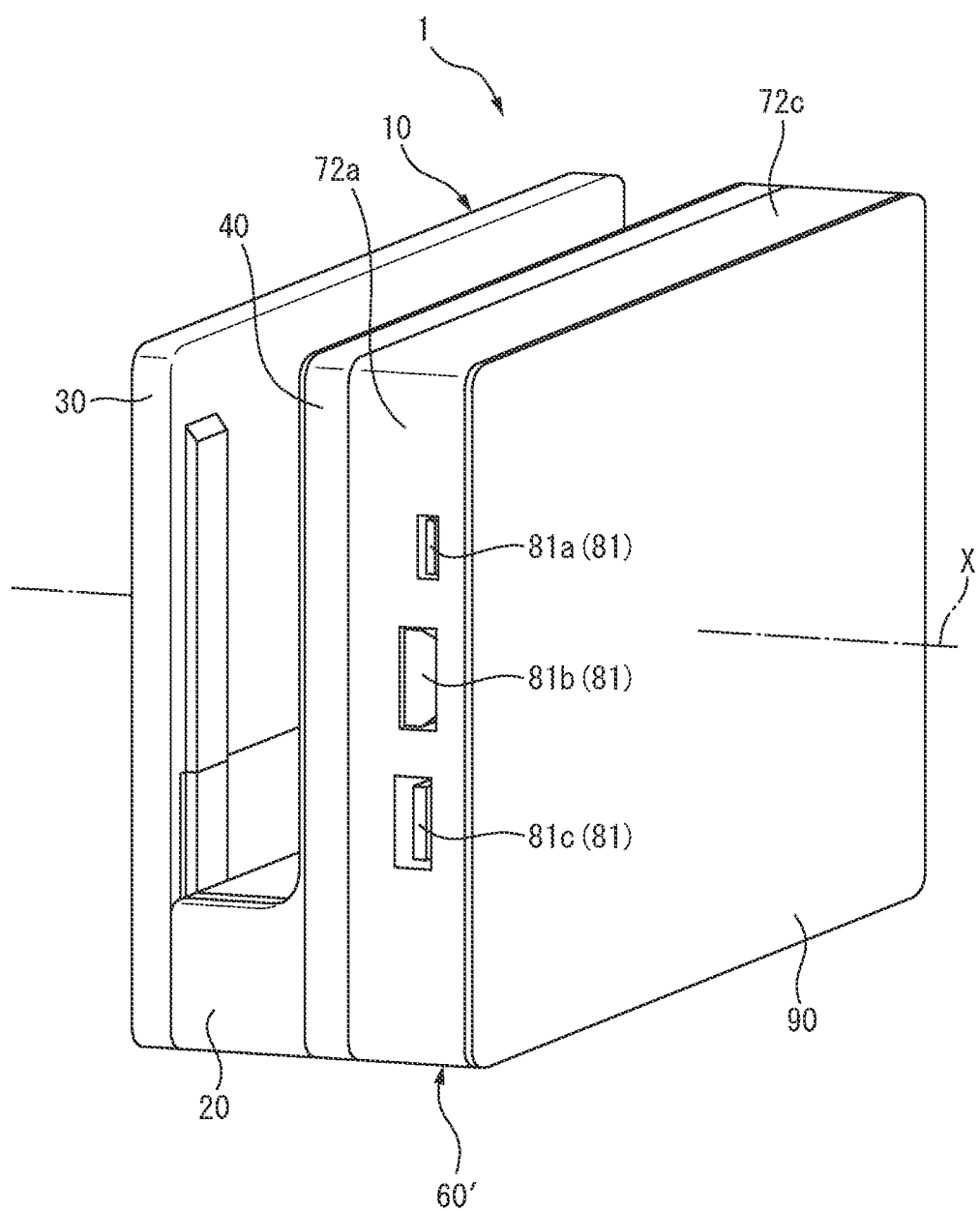
FIG. 16 is a perspective view, similar to FIG. 3, of the device holder in the case where an outer circumferential shape of the swivel block is the same as an outer circumferential shape of the main body.
Figure 17:
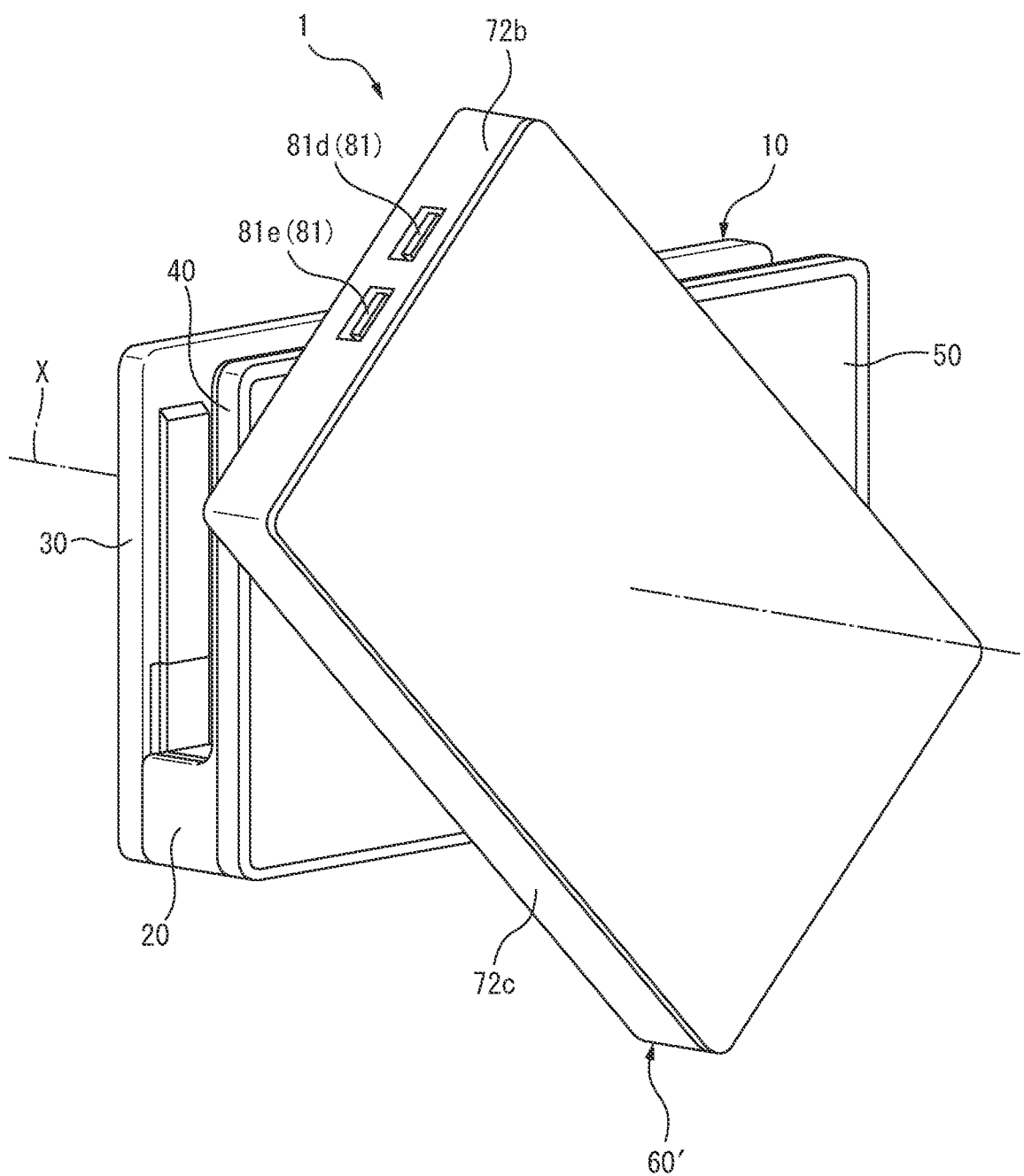
FIG. 17 is a perspective view, similar to FIG. 3, of the device holder in the case where an outer circumferential shape of the swivel block is the same as an outer circumferential shape of the main body.

FIGS. 16 and 17 are perspective views similar to FIG. 3 of the device holder 1 in the case where the outer circumferential shape of the swivel block 60' is the same as the outer circumferential shape of the main body 10. As shown in FIG. 17, the block mounting part 50 may be provided with side walls extending from the abutting wall 51 to the back.

As shown in FIGS. 16 and 17, the swivel block 60' according to one modification is attached to the main body 10 to be able to swivel about the swivel axis X extending in the front-back direction of the main body 10. In the present embodiment as well, the abutting housing 70 of the swivel block 60' is provided with side walls 72 extending from the outer circumference of the front wall 71 backward. The side walls 72 include a pair of mutually facing first side wall 72a and second side wall 72b and the mutually facing pair of the third side wall 72c and the fourth side wall 72d perpendicular to first side wall 72a and second side wall 72b.

In the present modification, the first side wall 72a and the second side wall 72b are formed so as to be flush with the main body side surface when the swivel block 60' is at the first swivel position or second swivel position. Similarly, the third side wall 72c and the fourth side wall 72d are formed so as to be flush with the upper side surface and lower side surface of the main body 10 when the swivel block 60' is at the first swivel position or second swivel position. Further, in the present modification as well, the first side wall 72a and the second side wall 72b, in the same way as the above embodiment, are respectively provided with pluralities of connector openings 73.

Further, in the above embodiment, by joining and fastening the half members 70a and 70b of the abutting housing 70 around the block support part 56, the abutting housing 70 is attached to the block mounting part 50 to be able to swivel. However, the abutting housing 70, in another aspect, may also be attached to the block mounting part 50 to be able to swivel. For example, the abutting housing 70 may be attached to the block mounting part 50 in the aspect such as shown in FIG. 18.

Figure 18:
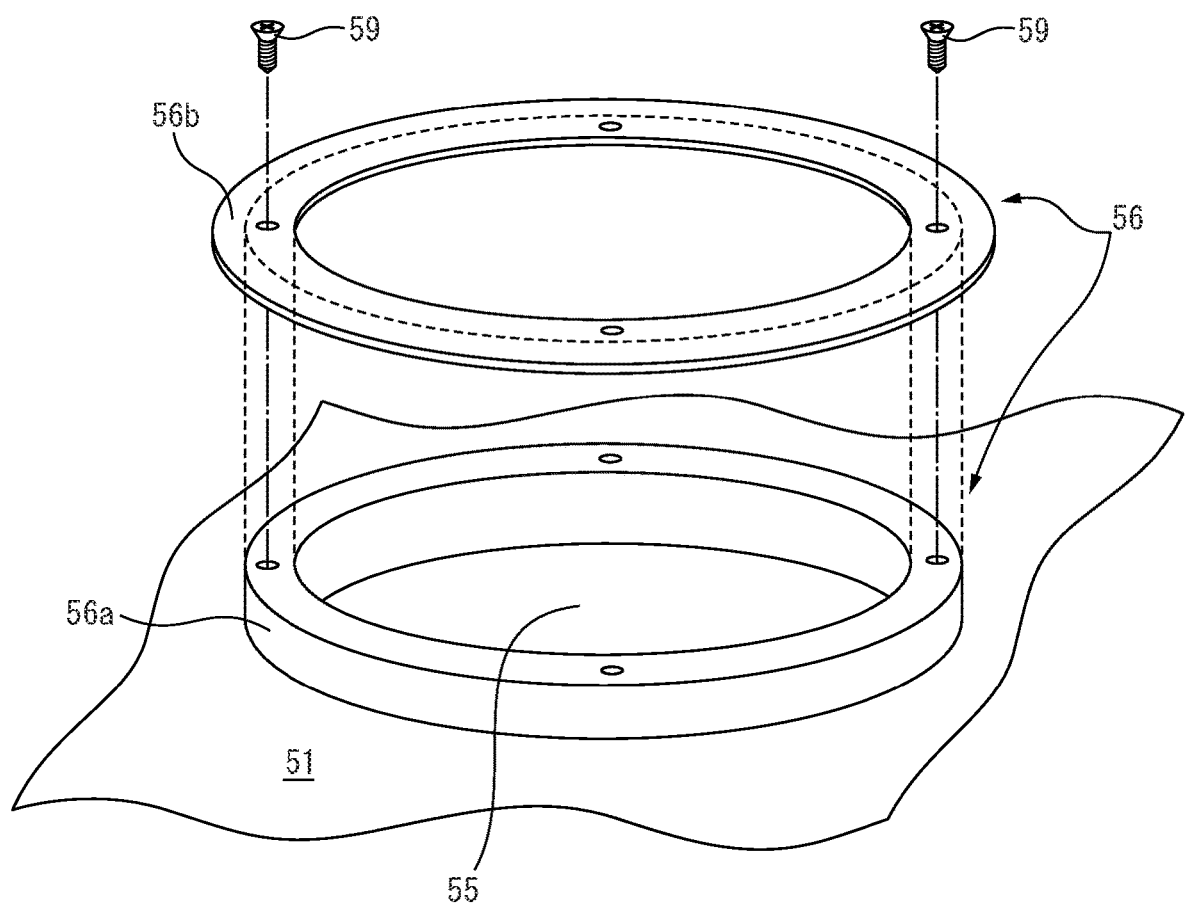
FIG. 18 is a perspective view, at the vicinity of the first insertion opening, of the abutting wall according to one modification.

FIG. 18 is a perspective view of the vicinity of the first insertion opening 55 in the abutting wall 51 according to one modification. As shown in FIG. 18, the block support part 56 of the abutting wall 51, in the same way as the above-mentioned embodiment, is provided with a cylindrical part 56a and flange part 56b. In the present embodiment, the cylindrical part 56a and the flange part 56b are formed as separate members.

When attaching the abutting housing 70 to the block mounting part 50, first, the abutting housing 70 is arranged so that the cylindrical part 56a fits into the second insertion opening 75 of the abutting housing 70. After that, as shown in FIG. 18, the flange part 56b is fastened by a plurality of screws 59 to the cylindrical part 56a. Due to this, the abutting housing 70 is attached to the block mounting part 50 to be able to swivel.

Further, the internal wiring 82 may be a circular cross-section cable or other wire of a form other than a flat sheet shape.

Furthermore, in the above embodiment, the swivel block is arranged at the rear of the main body 10. However, the swivel block may also be arranged below the main body 10. In this case, either the block mounting part 50 to which the swivel block 60 is attached is arranged below the placement part 20 at which the portable electronic device 100 is placed or one member functions as the placement part 20 and the block mounting part 50. Further, the swivel block 60 swivels about the swivel axis extending in the up-down direction.

In the above embodiment, as shown in FIG. 10, the arc shaped groove 57 extends centered about the swivel axis X over approximately 180°. Accordingly, the swivel block 60 can swivel over approximately 180°. However, the swivel block 60 may also be able to swivel over an angle larger than 180° if adopting at least a first swivel position and second swivel position. Therefore, for example, the arc shaped groove 57 may also extend over an angle less than 360° and more than 180°. Along with this, the swivel block 60 may also be able to swivel over an angle of less than 360° and larger than 180°. Alternatively, the first projection 76 and the arc shaped groove 57 need not be provided. In this case, the swivel block 60 can swivel without limiting the swivel angle.

Further, in the above embodiment, as shown in FIG. 6, side wall openings 53 are provided at the lateral side walls 52c and 52d so as to overlap the swivel block 60 when viewed from the lateral direction. However, the side wall openings 53 may also be provided at positions not overlapping the swivel block 60 when viewed from the lateral direction. Further, in addition to the side wall openings 53 provided at the lateral side walls 52c and 52d, an opening for passing cables connected to the external connectors 81 may be provided at the upper side wall 52a. In this case, this opening may be provided at the upper side wall 52a so that it at least partially overlaps the swivel block 60 when seen from the upward direction and may be provided at the upper side wall 52a so as to not overlap the swivel block 60 when viewed from the upward direction.

Further, in the above embodiment, as shown in FIG. 3, the block mounting part 50 is provided with the side walls 52. However, the block mounting part 50 need not be provided with the side walls 52.

Further, in the above embodiment, as shown in FIG. 9, a pair of the second projections 77 are provided, but just one may also be provided. In this case as well, when the swivel block 60 is at the first swivel position and second swivel position, the second projection 77 fits in the fitting groove 58 and the swivel block 60 is locked. In addition, in the above embodiment, the abutting wall 51 is provided with two fitting grooves 58. However, the abutting wall 51 may be provided with equal to or greater than two fitting grooves 58 so that the second projections 77 fit in the fitting groove 58 at swivel positions other than the first swivel position and second swivel position. In this case, the swivel block 60 is, for example, locked at not only the first swivel position and second swivel position, but also intermediate swivel positions swiveled 90° from the first swivel position and second swivel position. As explained above, at the intermediate swivel position, the external connector for power supply 81a and the external connector for video output 81b are positioned facing upward, therefore when the upper side wall 52a is also provided with openings, cables are connected to the external connectors 81a and 81b through this opening.

Furthermore, in the above embodiment, the external connector for power supply 81a and the external connector for video output 81b are provided at only one side surface of the swivel block 60. However, at least one of the external connector for power supply 81a and external connector for video output 81b may also be provided at the plurality of side surfaces of the plurality of swivel blocks 60. Specifically, for example, as explained above, if the upper side wall 52a is also provided with openings for passing cables, the adjoining side surfaces of the swivel block 60 (for example, first block side surface 63a and third block side surface 63c or second block side surface 63b and third block side surface 63c) may be provided with at least one of the external connector for power supply 81a and external connector for video output 81b.

Above, preferred embodiments according to the present disclosure and modifications of the same were explained, but the present disclosure is not limited to these embodiments and their modifications and can be corrected and changed in various ways within the language of the claims.

The invention claimed is:

1. A device holder for holding a portable electronic device provided with a display at its front surface,
the device holder comprising:
a main body configured to hold the portable electronic device in a state with the portable electronic device placed with one side surface downward, the main body comprising a surface configured to be placed on a placement surface while holding the portable electronic device; and,
a swivel block attached to the main body to be able to swivel,
wherein the main body is provided with a main body connector configured to connect to a device connector provided at the side surface of the portable electronic device when the portable electronic device is held at that main body,
the swivel block is provided at one side surface thereof with an external connector for video output for outputting video data based on data input through the main body connector to an external video display device, and is able to swivel between a first swivel position where the side surface, with which the external connector for video output is provided, faces a first side surface side of the main body and a second swivel position where the side surface, with which the external connector for video output is provided, faces a second side surface side at an opposite side to the first side surface of the main body.

2. The device holder according to claim 1, wherein the swivel block is provided with an external connector connectable to an operation input device used for inputting operations in the portable electronic device, on a side surface at an opposite side from the one side surface, with which the external connector for video output is provided.

3. The device holder according to claim 1, wherein the swivel block is provided with a USB connector on a side surface at an opposite side from the one side surface, with which the external connector for video output is provided.

4. The device holder according to claim 1, wherein
the main body is provided with a pair of lateral side walls corresponding to two sides of the swivel block in a lateral direction, and
the lateral side walls are provided with side wall openings configured to pass cables connected to the external connector of the swivel block.

5. The device holder according to claim 4, wherein the side wall openings of the pair of lateral side walls have shapes substantially symmetrical with respect to a center of the pair of lateral side walls.

6. The device holder according to claim 4, wherein the swivel block is arranged so that regardless of whether the swivel block is in the first swivel position or the second swivel position a distance between a respective side wall opening and its corresponding side surface of the swivel block which faces the respective side wall opening is substantially equal.

7. The device holder according to claim 1, wherein the swivel block is formed in a substantially cuboid shape, and has a plurality of side surfaces including the one side surface thereof with the external connector for video output for outputting video data based on data input through the main body connector to an external video display device, and another side surface opposite of the one side surface having the external connector for video output and/or an external connector not for video output, as another external connector, the plurality of side surfaces of the swivel block correspond to side surfaces of the cuboid, the external connector and the another external connector are provided only at the one side surface and the another side surface, and the swivel block is provided with at least one air vent opening at side surfaces of the plurality of side surfaces not provided with the external connector for video output and the another external connector among the plurality of side surfaces.

8. The device holder according to claim 1, wherein the swivel block is further provided with an external connector for power supply and a USB connector at the one side surface, with which the external connector for video output is provided, and the USB connector is arranged at an end of the external connector for video output and the external connector for power supply provided at the one side surface, with which the external connector for video output is provided.

9. The device holder according to claim 1, wherein the swivel block can swivel between the first swivel position and the second swivel position over approximately 180°, and is formed so that when swiveling between the first swivel position and the second swivel position, the external connector for video output faces an upward direction from the main body.

10. The device holder according to claim 1, wherein
the swivel block and the main body have mutually facing surfaces, one of the mutually facing surfaces is provided with a first projection offset from a swivel axis of the swivel block,
the other of the mutually facing surfaces is provided with an arc shaped groove or arc shaped opening inside of which the first projection slides, the arc shaped groove or the arc shaped opening extending in a circumferential direction centered about the swivel axis over approximately 180°.

11. The device holder according to claim 10, wherein
one of the mutually facing surfaces is provided with a second projection offset from a swivel axis of the swivel block,
the other of the mutually facing surfaces is provided with a fitting groove or a fitting opening in which the second projection is fit when the swivel block is at the first swivel position or the second swivel position, and
the second projection or the swivel block or the main body, with which the second projection is provided, is elastically formed so that when force in the swivel direction is applied to the swivel block in the state where the second projection is fit into the fitting groove or the fitting opening, the second projection can be pulled out from the fitting groove or the fitting opening.

12. The device holder according to claim 1, wherein the swivel block and the main body have mutually facing surfaces,
the main body is further provided with wiring, which is connected with the main body connector and external connector for video output of the swivel block,
the main body and the swivel block are respectively provided with a first insertion opening and second insertion opening at their mutually facing surfaces, and
the wiring passes through the first insertion opening and the second insertion opening.

13. The device holder according to claim 1, further comprising flat wiring which is connected with the main body connector and external connector for video output of the swivel block, wherein
the wiring is folded back so as to be twisted by approximately 90°, when the swivel block is at the first swivel position, and is folded back so as to be twisted by approximately 90° in the opposite direction to when the swivel block is at the first swivel position, when the swivel block is at the second swivel position.

14. The device holder according to claim 12, wherein the wiring is arranged so as to extend inside the swivel block at a position offset from a swivel axis of the swivel block toward the swivel axis, and is arranged so as to extend inside the main body at a position offset from the swivel axis toward the swivel axis.

15. The device holder according to claim 12, wherein the wiring is connected to a board arranged inside the swivel block, and the board is arranged inside the swivel block at an opposite side to the main body side.

16. The device holder according to claim 1, wherein
the main body is provided with an abutting wall abutting against the swivel block and a block support part,
the swivel block is provided with a circular opening,
the block support part is provided with a cylindrical part extending from the abutting wall toward the swivel block and a flange part projecting out from an end part of that cylindrical part to an outer circumferential direction,
the swivel block is formed so that an edge part around the circular opening fits in a groove defined by the flange part, the cylindrical part, and the abutting wall, and the edge part slides inside of the groove whereby the swivel block swivels with respect to the main body.

17. The device holder according to claim 1, wherein
the main body is provided with an abutting wall which abuts against the swivel block and is positioned between the swivel block and the portable electronic device when the portable electronic device is held at the main body, and
the abutting wall is provided with air vent openings at the two sides of the swivel block in a lateral direction.

18. A device holding system comprising a portable electronic device provided with a display at a front surface thereof and a device holder for holding that portable electronic device, wherein
the device holder comprises a main body for holding the portable electronic device in a state with the portable electronic device placed with one side surface downward and a swivel block attached to that main body to be able to swivel,
the main body is provided with a main body connector which is connected to a device connector provided at the side surface of the portable electronic device when the portable electronic device is held at that main body, the main body comprising a surface configured to be placed on a placement surface while holding the portable electronic device,
the swivel block is provided at one side surface thereof with an external connector for video output for outputting video data based on data input through the main body connector to an external video display device and is able to swivel between a first swivel position where the side surface, with which the external connector for video output is provided, faces a first side surface side of the portable electronic device held at the main body and a second swivel position where the side surface, with which the external connector for video output is provided, faces a second side surface side at an opposite side to the first side surface of the portable electronic device held at the main body.

* * * * *